United States Patent
Sagara et al.

(10) Patent No.: US 8,376,072 B2
(45) Date of Patent: Feb. 19, 2013

(54) MOLDED MOTOR AND ELECTRIC VEHICLE

(75) Inventors: Hiroaki Sagara, Kasai (JP); Kenji Taguchi, Hirakata (JP); Tetsuji Ueta, Hirakata (JP); Takeshi Nagao, Hirakata (JP); Takashi Uchino, Hirakata (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 451 days.

(21) Appl. No.: 12/646,536

(22) Filed: Dec. 23, 2009

(65) Prior Publication Data

US 2010/0163320 A1  Jul. 1, 2010

(30) Foreign Application Priority Data

Dec. 26, 2008 (JP) ................................. 2008-334270
Jan. 21, 2009 (JP) ................................. 2009-011205
Jan. 30, 2009 (JP) ................................... 2009-20648

(51) Int. Cl.
*B60K 7/00* (2006.01)

(52) U.S. Cl. ......................... 180/65.51; 310/52; 903/952

(58) Field of Classification Search .................. 180/65.1, 180/65.51, 65.6; 903/906, 952; 310/43, 310/52, 54, 58
See application file for complete search history.

(56) References Cited

U.S. PATENT DOCUMENTS

| | | | | |
|---|---|---|---|---|
| 5,111,089 A * | 5/1992 | Wakuta et al. | .................. | 310/54 |
| 6,836,036 B2 * | 12/2004 | Dube | .............................. | 310/64 |
| 6,958,562 B1 * | 10/2005 | Vargo et al. | ............ | 310/216.056 |
| 7,100,728 B2 * | 9/2006 | Huang et al. | .................. | 180/181 |
| 7,931,110 B2 * | 4/2011 | Nishiura et al. | .............. | 180/220 |

FOREIGN PATENT DOCUMENTS

| | | |
|---|---|---|
| JP | 08-098441 A | 4/1996 |
| JP | 2001-128402 A | 5/2001 |
| JP | 2006-320141 A | 11/2006 |
| JP | 2008-178190 A | 7/2008 |

* cited by examiner

*Primary Examiner* — John Walters
(74) *Attorney, Agent, or Firm* — Marvin A. Motsenbocker; Mots Law, PLLC

(57) ABSTRACT

A molded motor includes a ring-shaped stator and a rotor disposed inside the stator. The stator has teeth, insulators surrounding the teeth, coils wound around the insulators, and a molded part molding the teeth, insulators and coils. The insulators are partially exposed from the molded part.

3 Claims, 25 Drawing Sheets

MOLDED MOTOR AND ELECTRIC VEHICLE

CROSS REFERENCE TO RELATED APPLICATIONS

This application is based upon and claims the benefit of priority from prior Japanese Patent Application No. 2008-334270, filed on Dec. 26, 2008; prior Japanese Patent Application No. 2009-20648, filed on Jan. 30, 2009; and prior Japanese Patent Application No. 2009-11205, filed on Jan. 21, 2009; the entire contents of which are incorporated herein by reference.

BACKGROUND OF THE INVENTION

1. Field of the Invention

The present invention relates to a molded motor including a stator having multiple teeth molded with resin, and an electric vehicle equipped with the molded motor.

2. Description of the Related Art

A molded motor has been widely used as a drive source for an electric vehicle, a washing machine and the like.

The molded motor includes an annular stator and a rotor disposed inside the stator. The stator has multiple teeth molded with resin. An insulator surrounds a periphery of each of the teeth, and a coil is wound around a periphery of the insulator.

Here, various efforts have been made to improve a rated output by efficiently releasing heat from a coil heated by energization (see, for example, Japanese Patent Application Publication No. 2008-178190, hereinafter Patent Document 1). Patent Document 1 discloses a method for transmitting the heat of the coil to a housing through a heatsink.

Meanwhile, there has been proposed a method for transmitting the heat of the coil to the teeth having a high thermal conductivity through the insulator around which the coil is wound (see Japanese Patent Application Publication No. 2001-128402, hereinafter Patent Document 2). This method does not need to provide the heatsink. Thus, miniaturization of the motor and cost reduction can be achieved.

However, in the molded motor, the teeth, insulators and coils are molded with resin. Thus, the method described in Patent Document 2 has its limits in improving heat release properties. In other words, an increase in heat transfer paths for releasing heat from the coils allows for more efficient heat release.

SUMMARY OF THE INVENTION

A molded motor according to an aspect of the present invention includes: a ring-shaped stator and a rotor disposed inside the stator. The stator has teeth, insulators surrounding the teeth, coils wound around the insulators, and a molded part molding the teeth, insulators and coils. The insulators are partially exposed from the molded part.

In the aspect of the present invention, the insulator may be made of a material having higher thermal conductivity than resin forming the molded part.

In the aspect of the present invention, the insulator may have a protrusion protruding outward in a radial direction of the stator.

In the aspect of the present invention, the protrusion may have a shape extending along a circumferential direction of the stator.

An electric vehicle according to an aspect of the present invention includes: a wheel configured to be rotatably driven and a molded motor configured to drive the wheel. The molded motor includes a ring-shaped stator and a rotor disposed inside the stator. The stator has teeth, insulators surrounding the teeth, coils wound around the insulators, and a molded part molding the teeth, insulators and coils. The insulators are partially exposed to the outside of the molded part.

A molded motor according to an aspect of the present invention used as a drive source for an electric vehicle, includes: a cylindrical stator having a resin molded part molding multiple teeth; a rotor rotated inside the stator; and a motor case provided on a cylindrical end face of the cylindrical stator. The resin molded part has multiple first fins formed in a region of the cylindrical end face, the region is exposed from the motor case. Each of the multiple first fins is extended in a front and rear direction of the electric vehicle.

In the molded motor according to the aspect of the present invention, the motor case may be extended in the front and rear direction of the electric vehicle on the cylindrical end face, and each of the multiple first fins may follow the outer shape of the motor case, in a planar view of the cylindrical end face.

In the molded motor according to the aspect of the present invention, the outer shape of the motor case may become wider in a vertical direction toward the rear of the electric vehicle, in the planar view of the cylindrical end face.

In the molded motor according to the aspect of the present invention, the resin molded part may have multiple second fins formed on a peripheral surface of the cylindrical stator, and each of the multiple second fins may be extended in the front and rear direction of the electric vehicle.

An electric vehicle according to an aspect of the present invention includes a drive wheel and a molded motor configured to drive the drive wheel. The electric vehicle includes: a cylindrical stator having a resin molded part molding multiple teeth; a rotor rotated inside the stator; and a motor case provided on a cylindrical end face of the cylindrical stator. The resin molded part has multiple fins formed in a region of the cylindrical end face, the region is exposed from the motor case. Each of the multiple fins is extended in a front and rear direction of the electric vehicle.

The electric vehicle according to the aspect of the present invention further includes: a swing arm configured to support the drive wheel and the molded motor; a suspension configured to absorb impact applied to the drive wheel from a road surface; and a suspension case attached to the swing arm in front of the molded motor and configured to support the suspension. An opening is provided between the swing arm and the suspension case, and the opening may be positioned in front of the molded motor.

A molded motor according to an aspect of the present invention includes: a rotor having a ring-shaped stator; a rotor core having multiple rotor magnets and a rotor plate disposed on a side surface of the rotor core; and a position detecting magnet attached to the rotor and used for detecting positions of the multiple rotor magnets. The rotor is configured to rotate inside the stator. The rotor core and the rotor plate are integrally molded with resin. The rotor plate has a first region exposed from the resin, and the position detecting magnet is attached to the first region.

In the molded motor according to the aspect of the present invention, the rotor plate has a first main surface on which the rotor core is disposed and a second main surface provided on the side opposite to the first main surface, and the first region may be formed on the second main surface.

In the molded motor according to the aspect of the present invention, the second main surface has a second region which surrounds the first region and is covered with resin. The first region may protrude from the second region toward the side opposite to the first main surface.

In the molded motor according to the aspect of the present invention, the multiple rotor magnets may be arranged in a ring form on the first main surface, and the position detecting magnet may be disposed at an inner side of the multiple rotor magnets on a projection plane approximately perpendicular to a shaft center of the rotor.

An electric vehicle according to an aspect of the present invention includes a wheel configured to be rotatably driven and a molded motor configured to drive the wheel. The molded motor includes: a rotor having a ring-shaped stator, a rotor including a rotor core having multiple rotor magnets and a rotor plate disposed on a side surface of the rotor core; and a position detecting magnet attached to the rotor and used for detecting positions of the multiple rotor magnets. The rotor is configured to rotate inside the stator. The rotor core and the rotor plate are integrally molded with resin. The rotor plate has a first region exposed from the resin, and the position detecting magnet is attached to the first region.

DETAILED DESCRIPTION OF THE EMBODIMENTS

Figure 1:
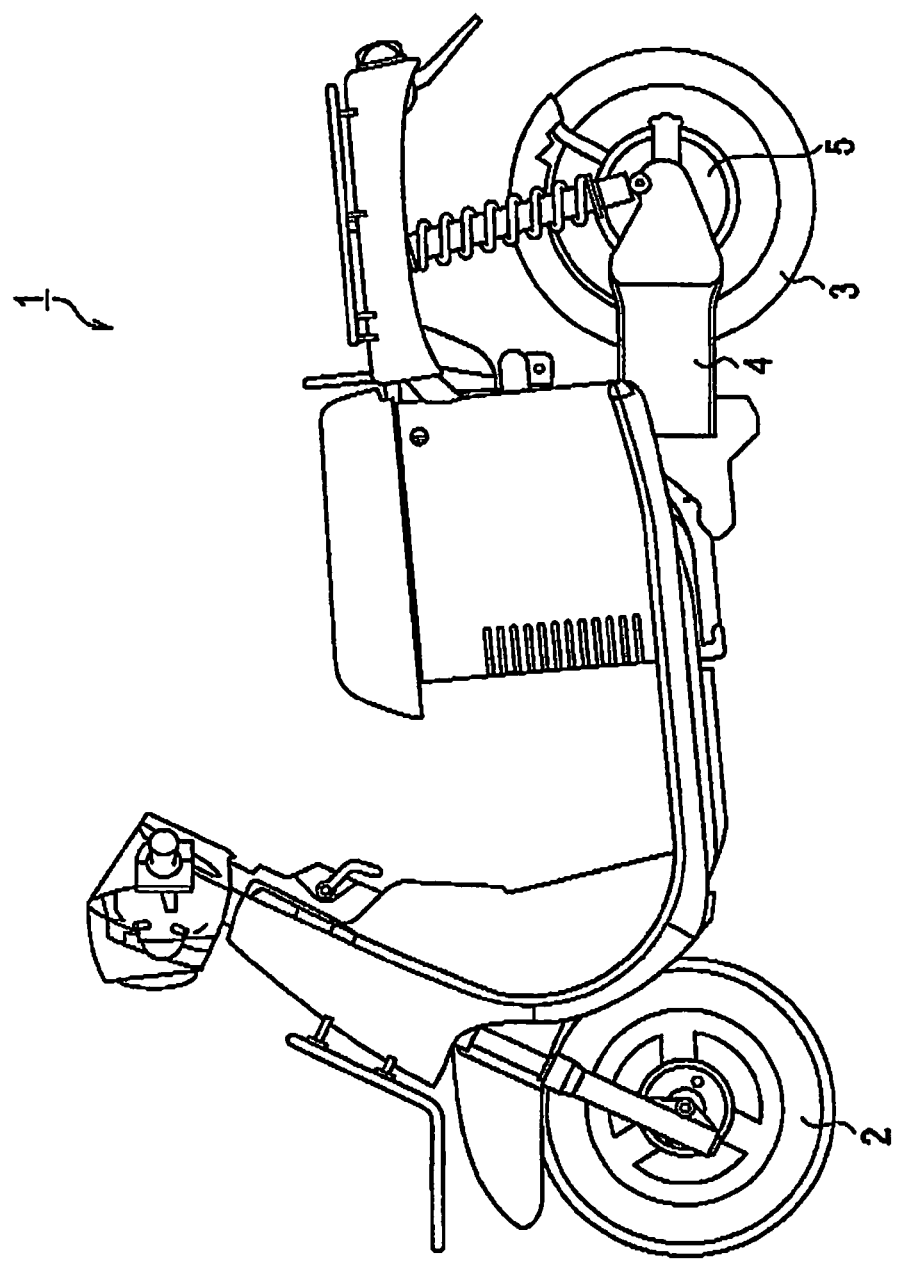
FIG. 1 is a right side view of an electric motorcycle 1 according to a first embodiment of the present invention.

Next, with reference to the drawings, embodiments of the present invention will be described. In the following description of the drawings, the same or similar parts will be denoted by the same or similar reference numerals. However, it should be noted that the drawings are schematic and ratios of respective dimensions and the like are different from actual ones. Therefore, specific dimensions and the like should be determined by taking into consideration the following description. Moreover, as a matter of course, also among the drawings, there are included portions in which dimensional relationships and ratios are different from each other. Note that, in each of the drawings, a front of a vehicle is a direction F, a rear of the vehicle is a direction R, and a front and rear direction of the vehicle is a direction FR.

[First Embodiment]
(Schematic Configuration of Electric Vehicle)

With reference to the drawings, description will be given of an electric motorcycle 1 that is an electric vehicle to which a molded motor according to a first embodiment of the present invention is applied. FIG. 1 is a right side view of the electric motorcycle 1.

As shown in FIG. 1, the electric motorcycle 1 is a so-called under-bone type electric motorcycle having a vehicle body frame provided on the lower side. The electric motorcycle 1 includes a front wheel 2, a rear wheel 3, a swing arm 4 and a molded motor 5.

The front wheel 2 is rotatably supported by a front fork. The rear wheel 3 is rotatably supported by the swing arm 4. The swing arm 4 is swingably attached to the vehicle body frame.

The molded motor 5 is fixed to the swing arm 4. A driving force generated by the molded motor 5 is transmitted to the rear wheel 3 through a motor shaft 50 (see FIG. 2) provided approximately in the center of the molded motor 5. The molded motor 5 may be a geared motor with a built-in reducer. A configuration of the molded motor 5 will be described later.

(Configuration of Molded Motor)

With reference to the drawings, description will be given below of the configuration of the molded motor according to the first embodiment. Note that, in the following description, an "output side" is a side of the molded motor 5 where the motor shaft 50 is connected to the rear wheel 3 and an "opposite output side" is a side opposite to the output side of the molded motor 5.

Figure 2:
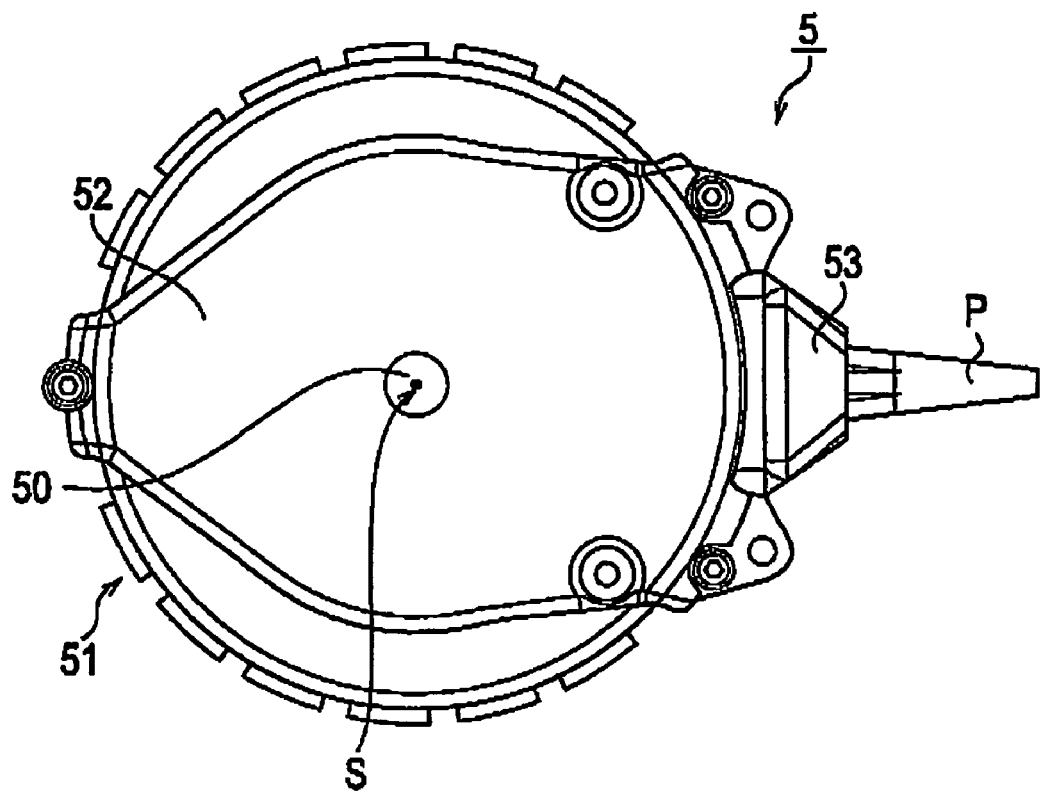
FIG. 2 is a plan view of a molded motor 5, seen from an output side, according to the first embodiment of the present invention.

FIG. 2 is a plan view of the molded motor 5 seen from the output side. As shown in FIG. 2, the molded motor 5 includes the motor shaft 50, a stator 51, a motor case 52 and a terminal box 53.

The motor shaft 50 is provided approximately in the center of the molded motor 5 in a planar view. The motor shaft 50 is inserted into the motor case 52. The rear wheel 3 is driven by rotation of the motor shaft 50 around a shaft center S.

The stator 51 is formed into a ring shape with the motor shaft 50 as its center. In an internal space SP (see FIG. 5) formed inside the stator 51, an unillustrated rotor is disposed. The motor shaft 50 is rotated with rotation of the rotor. A configuration of the stator 51 will be described later.

The motor case 52 is provided on the output side of the stator 51. The motor case 52 covers the output side of the internal space SP, and the internal space SP is sealed by the motor case 52. The motor shaft 50 motor shaft 50 is inserted into the motor case 52. The motor case 52 is screwed to the swing arm 4.

The terminal box 53 stores a terminal portion of a cable P to be connected to a battery.

(Configuration of Stator)

With reference to the drawings, description will be given below of the configuration of the stator 51.

Figure 3:
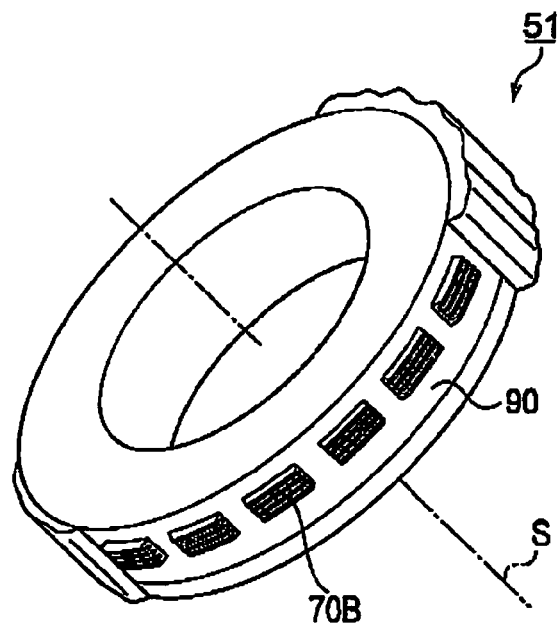
FIG. 3 is a perspective view of a stator 51, seen from the output side, according to the first embodiment of the present invention.
Figure 4:
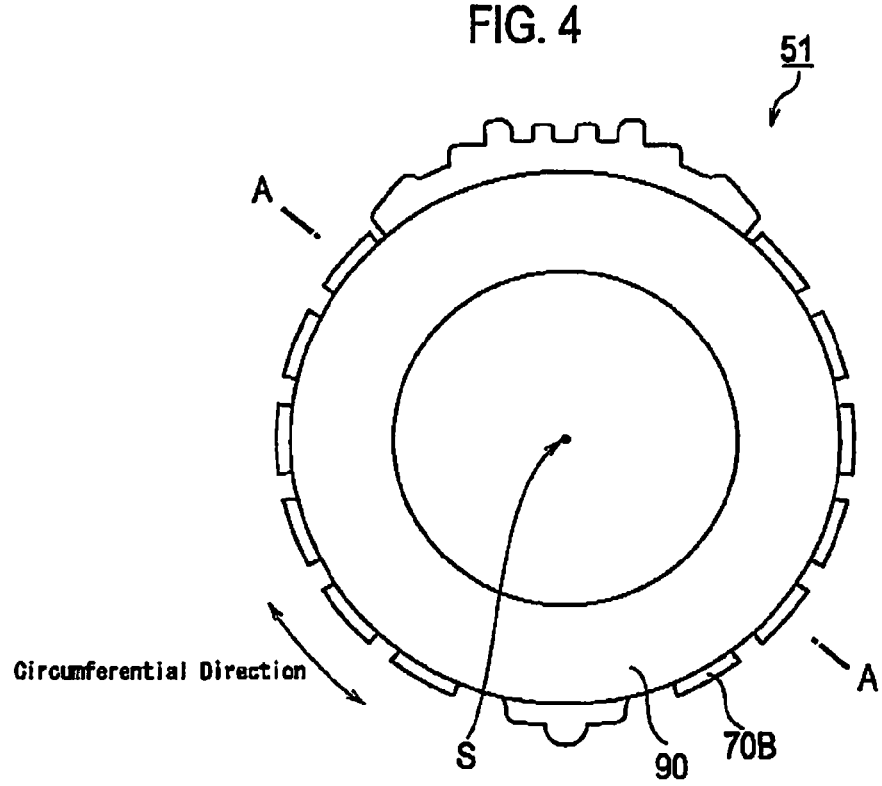
FIG. 4 is a plan view of the stator 51, seen from the output side, according to the first embodiment of the present invention.
Figure 5:
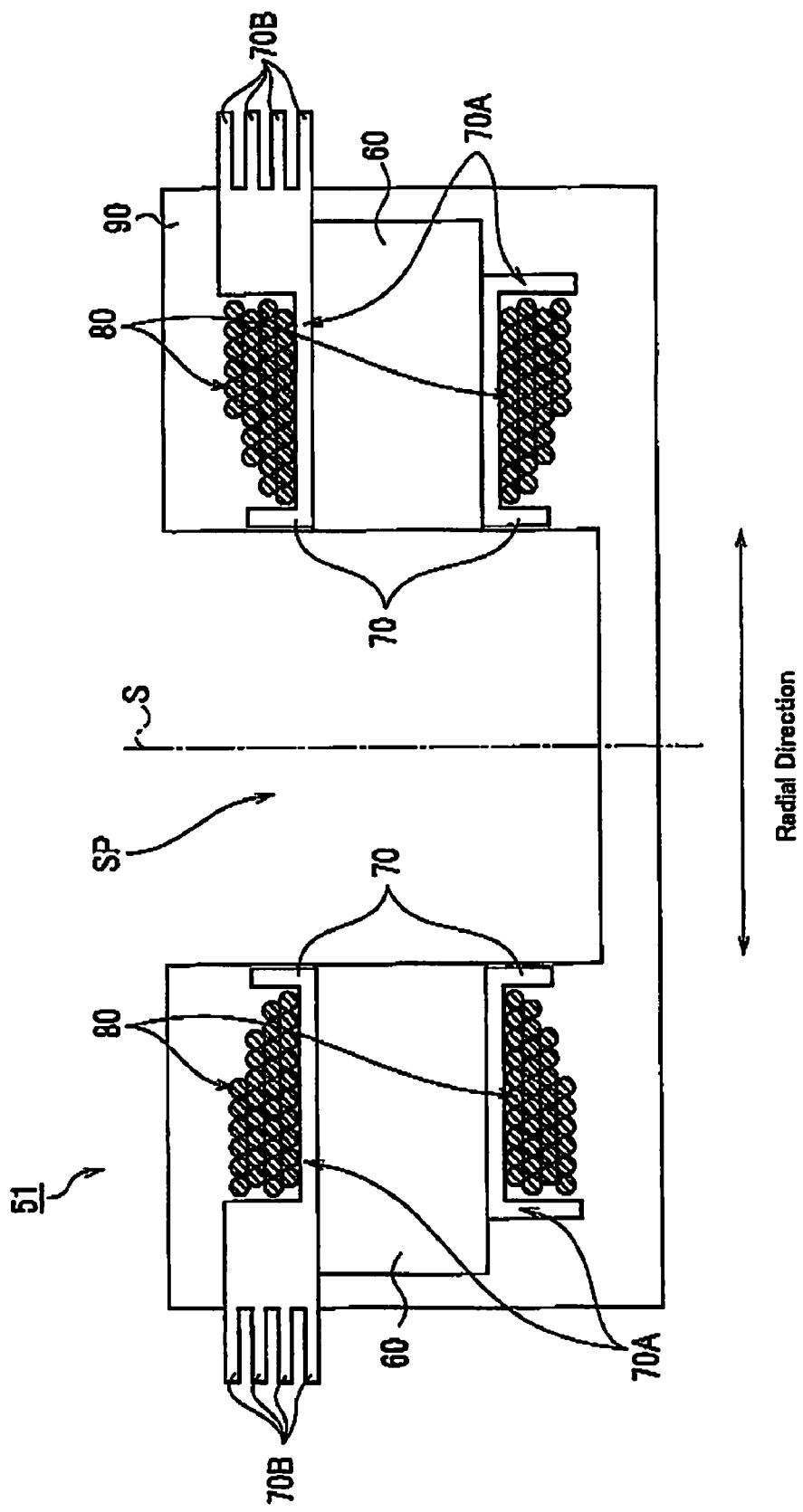
FIG. 5 is a cross-sectional view taken along the line A-A in FIG. 4.

FIG. 3 is a perspective view of the stator 51, seen from the output side, according to the first embodiment. FIG. 4 is a plan view of the stator 51, seen from the output side, according to the first embodiment. FIG. 5 is a cross-sectional view taken along the line A-A in FIG. 4.

As shown in FIGS. 3 to 5, the stator 51 has multiple teeth 60, multiple insulators 70, coils 80 and a molded part 90.

The multiple teeth 60 are arranged at predetermined intervals in a circumferential direction (see FIG. 4) of the annular stator 51. Each of the teeth 60 is formed of a magnetic material (for example, an electromagnetic steel plate or powder metal). Each tooth 60 is extended in a radial direction (see FIG. 5) approximately perpendicular to the shaft center S. One end portion of the tooth 60 is exposed to the internal space SP and faces the unillustrated rotor.

Each of the multiple insulators 70 surrounds a periphery of each of the multiple teeth 60. For example, when each of the teeth 60 is formed in a cylindrical shape, the insulator 70 surrounds the tooth 60 so as to cover a cylindrical surface thereof.

Each of the multiple coils 80 is wound around each of the multiple teeth 60 more than once. By energizing the coils 80, a torque is generated in the rotor facing the respective teeth 60. In this event, each coil 80 generates heat.

The molded part 90 is formed into a ring shape with the shaft center S as its center, and forms an outer shape of the stator 51. The teeth 60, the insulators 70 and the coils 80 are molded by the molded part 90. The molded part 90 is made of an insulating resin material such as thermosetting resin.

Here, as shown in FIG. 5, each of the insulators 70 has a wound part 70A, around which the coil 80 is wound, and multiple protrusions 70B.

The heat generated in the coil 80 by energization is transmitted to the wound part 70A.

The multiple protrusions 70B protrude outward in a radial direction of the stator 51 from the wound part 70A. Therefore, the insulators 70 are exposed from the molded part 90 in the multiple protrusions 70B. Moreover, as shown in FIG. 4, each of the protrusions 70B has a shape extending along the circumferential direction of the stator 51. Specifically, each protrusion 70B has a fin shape. Note that, in the first embodiment, the multiple protrusions 70B protrude from the output side of the wound part 70A.

(Heat Release Path)

Figure 6:
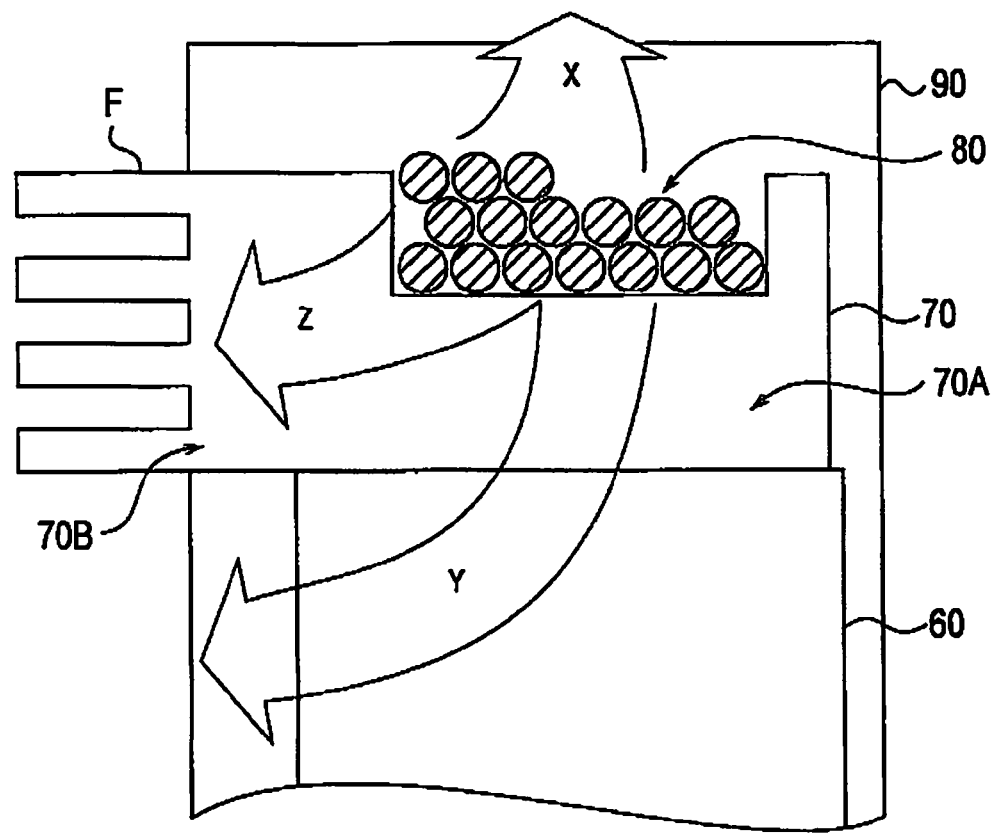
FIG. 6 is a schematic view showing heat release paths in the molded motor 5 according to the first embodiment of the present invention.

Next, with reference to the drawings, description will be given of heat release paths for the heat generated in the coil 80. FIG. 6 is a schematic view showing main heat release paths.

As shown in FIG. 6, there are mainly three heat release paths. A heat release path X is a path to the outside from the coil 80 through the molded part 90.

A heat release path Y is a path to the outside from the coil 80 sequentially through the insulator 70, the teeth 60 and the molded part 90.

A heat release path Z is a path to the outside from the coil 80 through the insulator 70. To be more specific, the heat release path Z is made up of the wound part 70A and the protrusions 70B. Thus, in the heat release path Z, the heat of the coil 80 is released directly to the outside through the insulator 70. Therefore, it is preferable that the insulator 70 be made of a material having higher thermal conductivity than the resin forming the molded part 90.

Advantages and Effects

In the molded motor 5 according to the first embodiment, the insulator 70 is exposed from the molded part 90 in the protrusions 70B. Therefore, the heat generated in the coil 80 is transmitted to the outside of the stator 51 through the insulator 70. Thus, the heat release paths for the heat generated in the coil 80 can be increased. As a result, the heat generated in the coil 80 can be efficiently released.

Moreover, in the first embodiment, the insulator 70 is made of the material having higher thermal conductivity than the resin forming the molded part 90. Therefore, heat release efficiency in the heat release path Z described above can be increased higher than that in the heat release path X. As a result, the heat release efficiency can be further improved.

Moreover, in the first embodiment, the insulator 70 has the multiple protrusions 70B protruding outward in the radial direction of the stator 51. Therefore, an area of contact between the insulator 70 and the external air can be increased. As a result, the heat release efficiency can be further improved.

Moreover, in the first embodiment, each of the protrusions 70B is extended in the circumferential direction of the stator 51. Specifically, each protrusion 70B has the fin shape. Therefore, as shown in FIG. 1, in a mounted state of the molded motor 5, a travelling wind can easily flow between the multiple protrusions 70B. As a result, the heat release efficiency can be further improved.

[Second Embodiment]

Next, with reference to the drawings, description will be given of a stator 51 according to a second embodiment of the present invention. In the following description, differences from the first embodiment will be mainly described.

Figure 7:
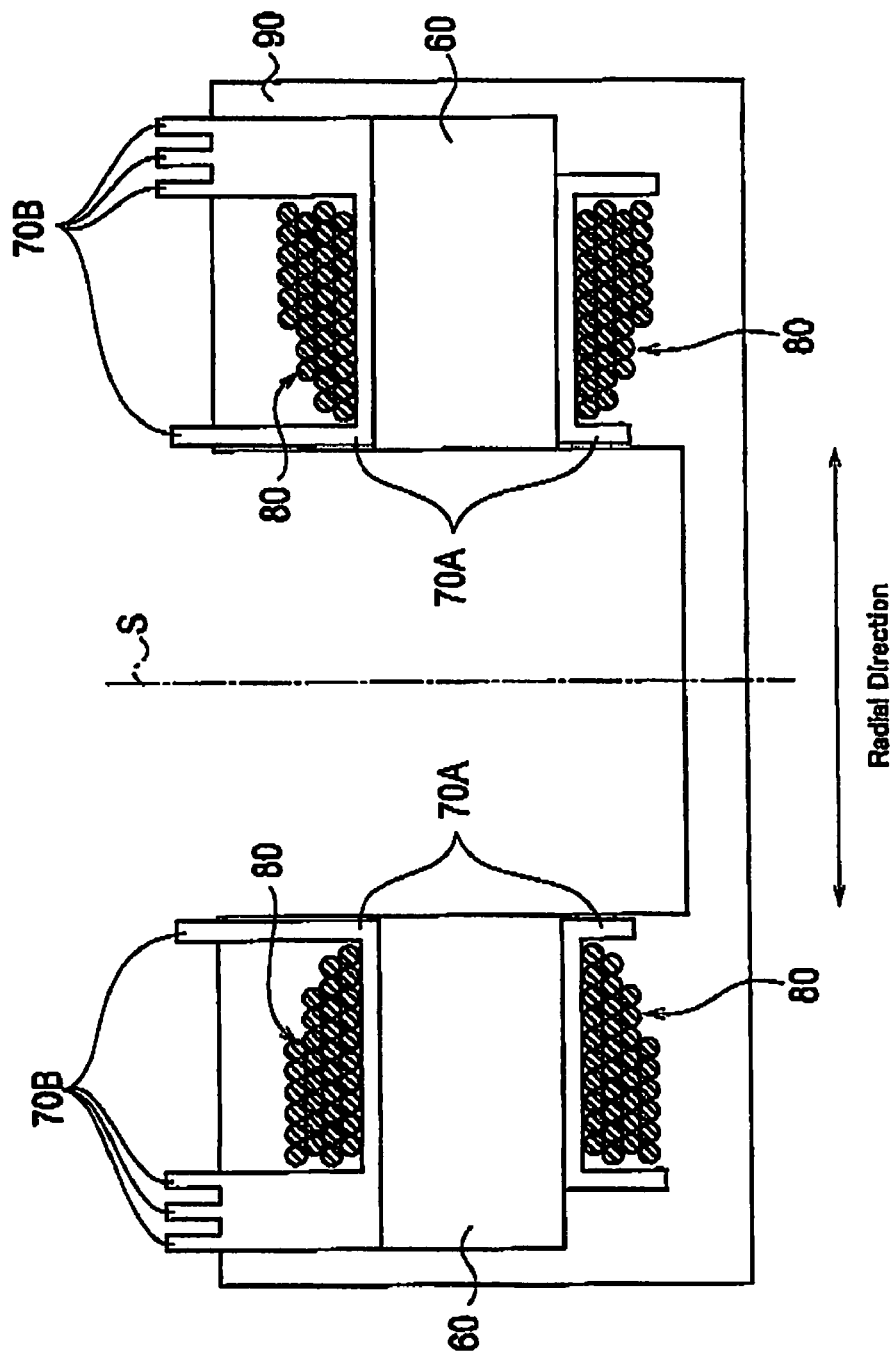
FIG. 7 is a cross-sectional view showing a configuration of a stator 51 according to a second embodiment of the present invention.

FIG. 7 is a cross-sectional view showing a configuration of the stator 51 according to the second embodiment. As shown in FIG. 7, multiple protrusions 70B protrude outward along a shaft center S direction from a wound part 70A. To be more specific, each of the protrusions 70B protrudes toward the output side of the stator 51 from the wound part 70A. Therefore, an insulator 70 is exposed from a molded part 90 in the protrusions 70B.

(Advantages and Effects)

In the molded motor 5 according to the second embodiment, the insulator 70 is exposed from the molded part 90 in the protrusions 70B. Therefore, heat generated in a coil 80 is transmitted to the outside of the stator 51 through the insulator 70. Thus, heat release paths for the heat generated in the coil 80 can be increased. As a result, the heat generated in the coil 80 can be efficiently released.

[Other Embodiments]

Although the present invention has been described with reference to the above embodiments, it should be understood that the present invention is not limited to the description and drawings which constitute a part of this disclosure. From this disclosure, various alternative embodiments, examples and operational technologies will become apparent to those skilled in the art.

Figure 8:
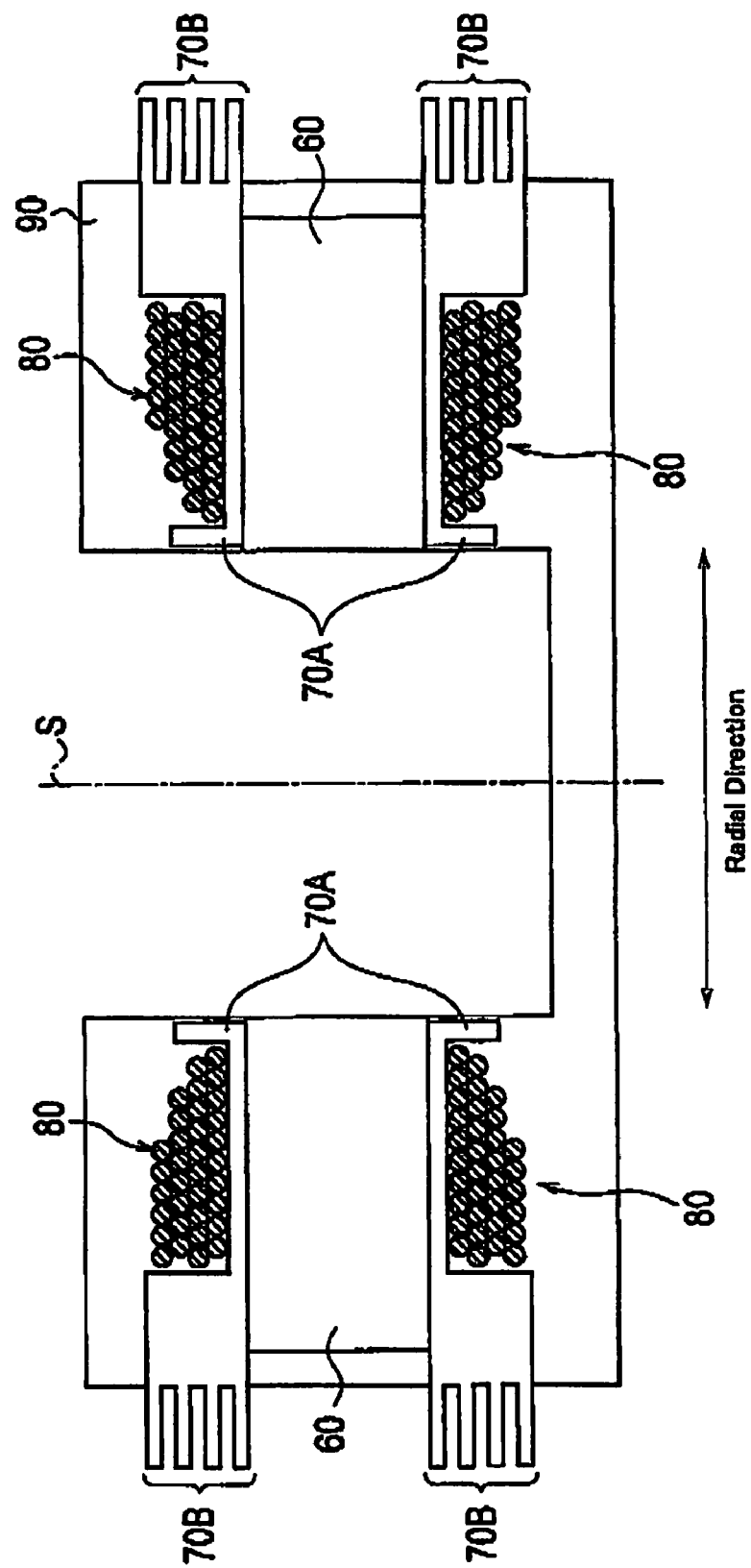
FIG. 8 is a view showing a configuration of a molded motor 5 according to an embodiment of the present invention.

For example, although the multiple protrusions 70B protrude from the output side of the wound part 70A in the first embodiment, the protrusions 70B may protrude from the opposite output side of the wound part 70A. To be more specific, as shown in FIG. 8, the insulator 70 has a vertically symmetrical configuration, which enables the heat of the coil to be released also from the opposite output side of the wound part 70A. Thus, the heat release efficiency can be further improved.

Figure 9:
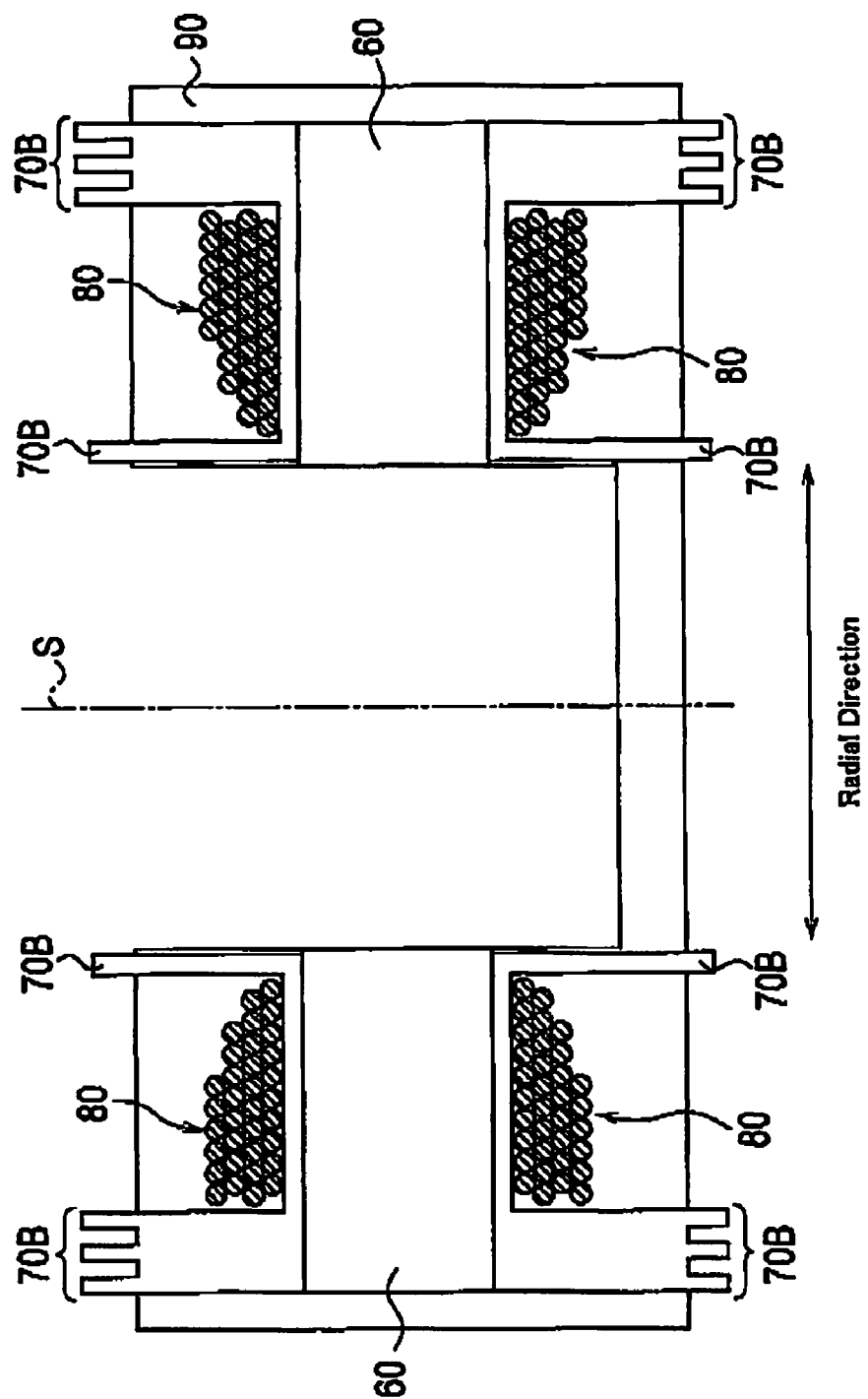
FIG. 9 is a view showing a configuration of a molded motor 5 according to an embodiment of the present invention.

Moreover, although the multiple protrusions 70B protrude toward the output side of the stator 51 from the wound part 70A in the second embodiment, the protrusions 70B may protrude toward the opposite output side of the stator 51 from the wound part 70A. To be more specific, as shown in FIG. 9, the insulator 70 has a vertically symmetrical configuration, which enables the heat of the coil to be released toward the opposite output side from the wound part 70A. Thus, the heat release efficiency can be further improved.

Figure 10:
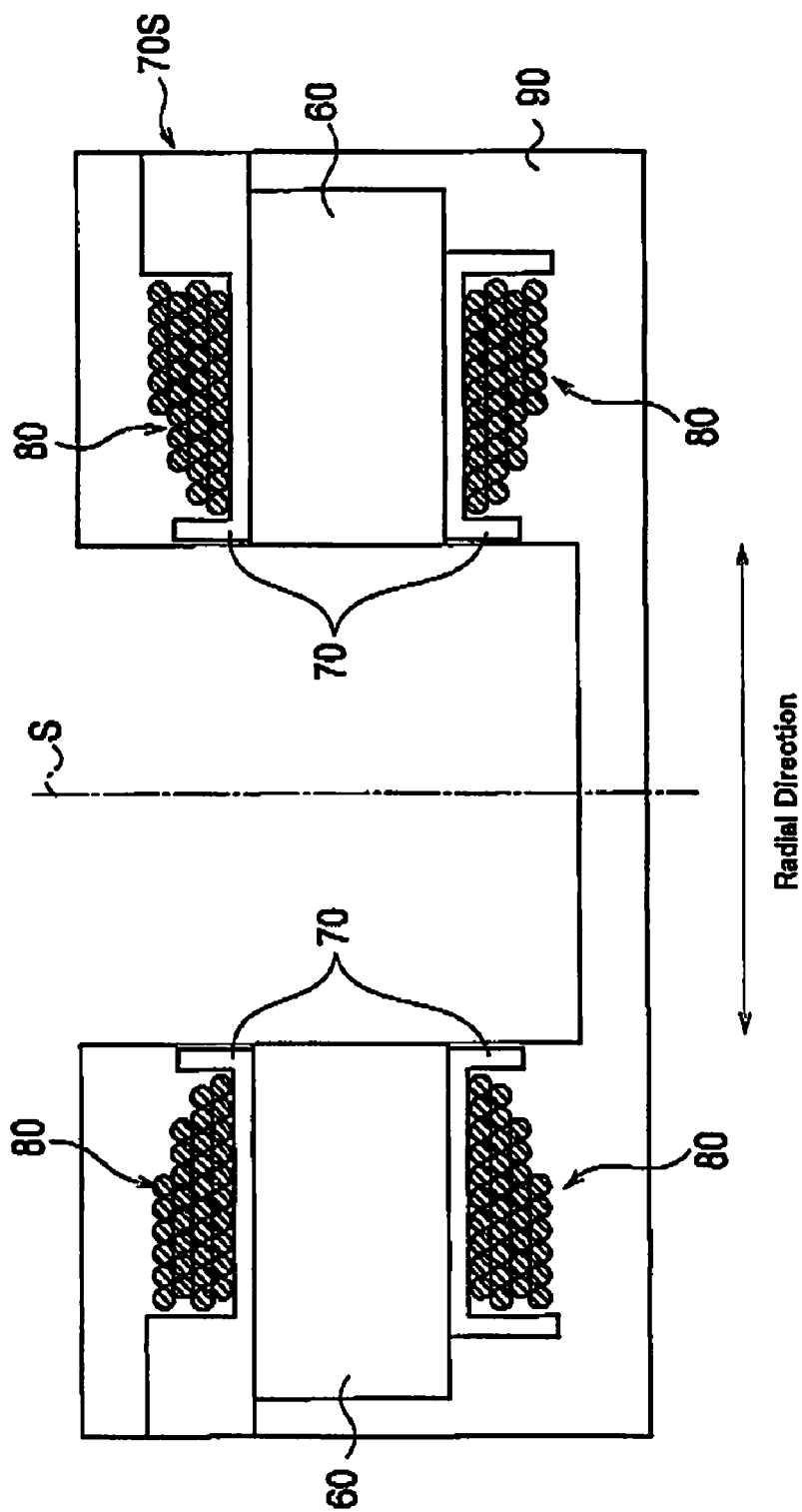
FIG. 10 is a view showing a configuration of a molded motor 5 according to an embodiment of the present invention.

Moreover, although the description has been given of the configuration in which the insulator 70 has the protrusions 70B in the above embodiments, the insulator 70 may not necessarily have the protrusions 70B. To be more specific, as shown in FIG. 10, only a part of the insulator 70 needs to be exposed from the molded part 90. Thus, the heat release paths can be increased.

Figure 11:
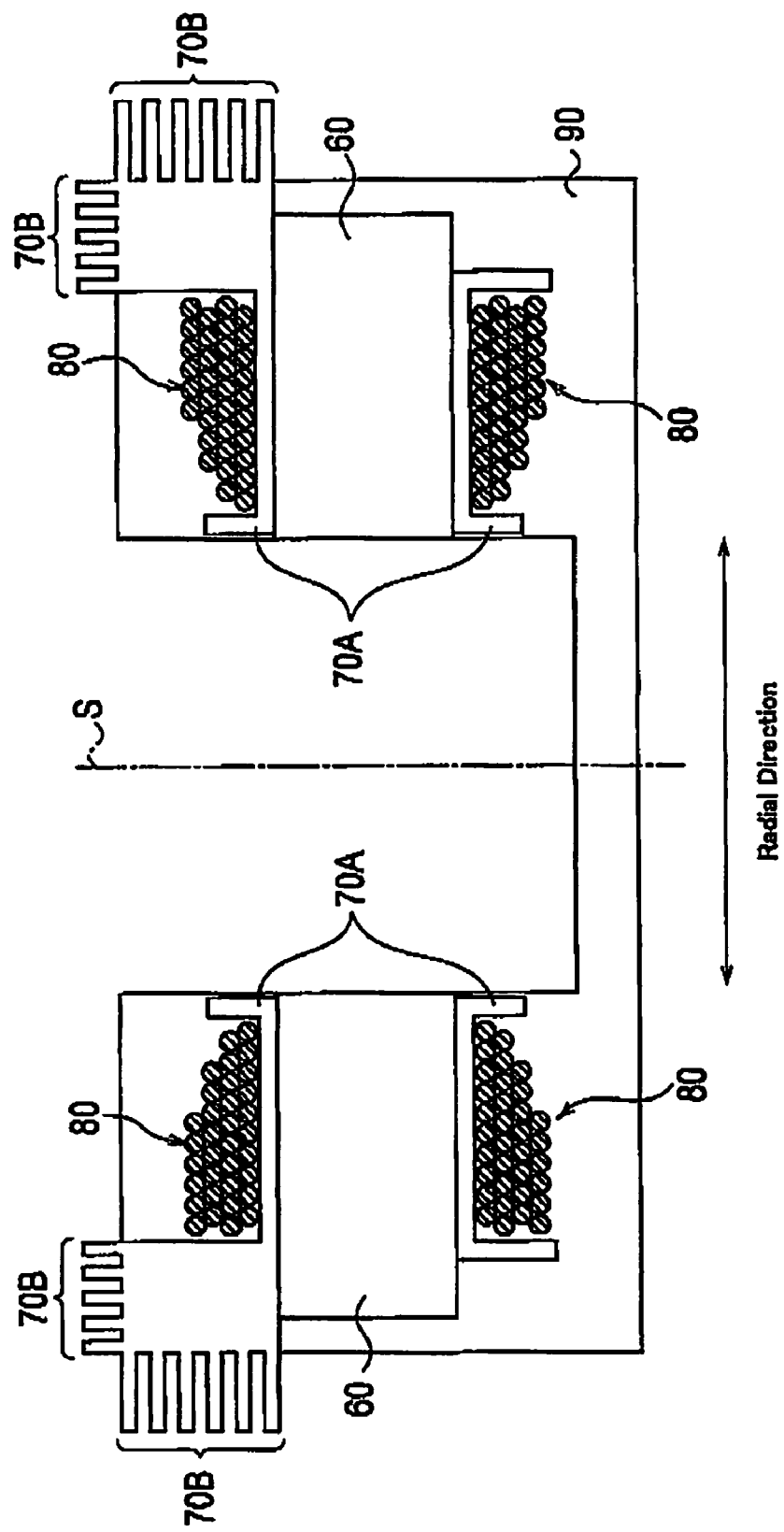
FIG. 11 is a view showing a configuration of a molded motor 5 according to an embodiment of the present invention.
Figure 12:
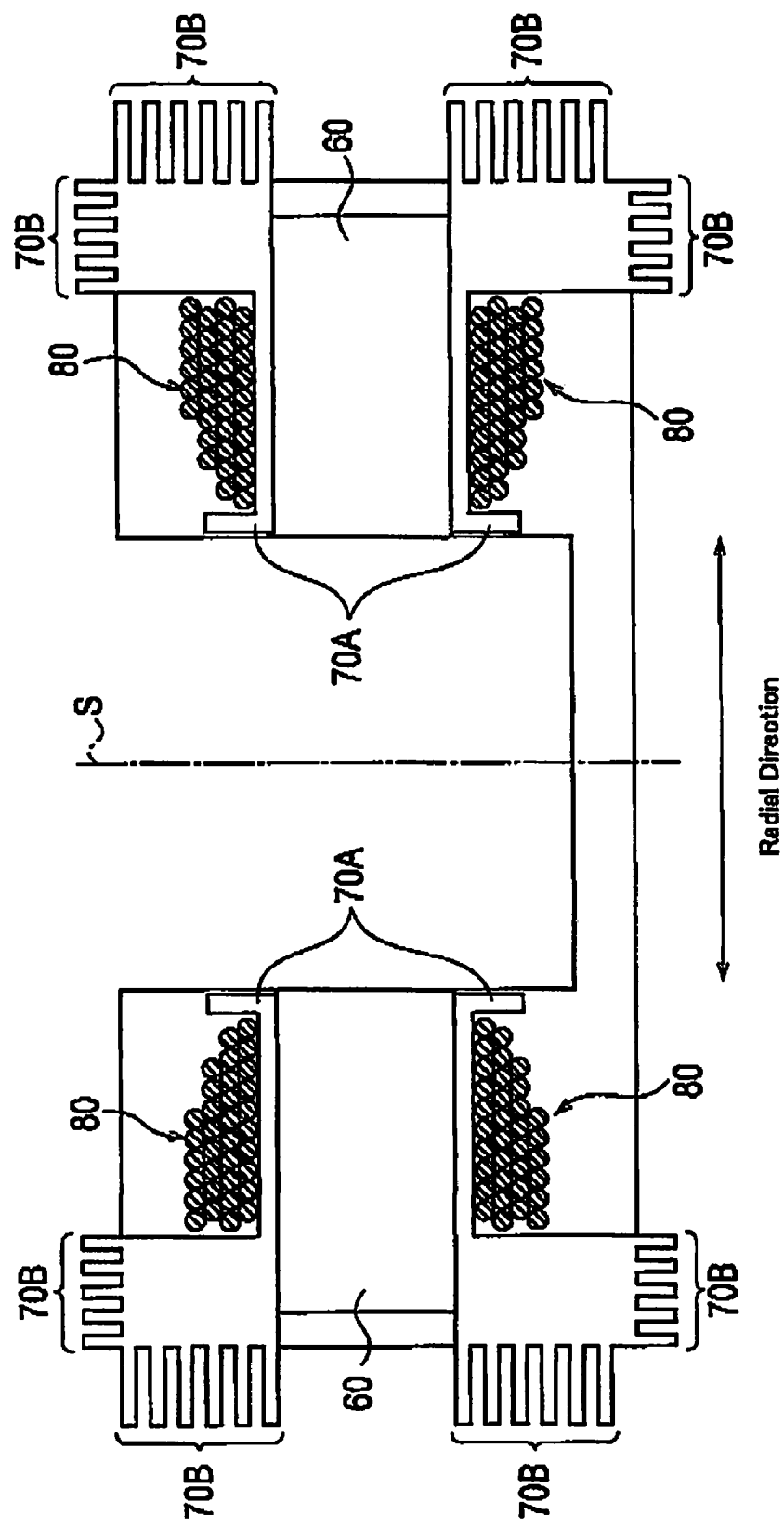
FIG. 12 is a view showing a configuration of a molded motor 5 according to an embodiment of the present invention.

Furthermore, although there is no particular mention in the above embodiments, the insulator 70 may include both of the protrusions 70B according to the first and second embodiments. To be more specific, as shown in FIGS. 11 and 12, the insulator 70 may include both of the protrusions 70B protruding in the radial direction from the wound part 70A and the protrusions 70B protruding in the shaft center direction from the wound part 70A.

[Third Embodiment]

(Schematic Configuration of Electric Vehicle)

Figure 13:
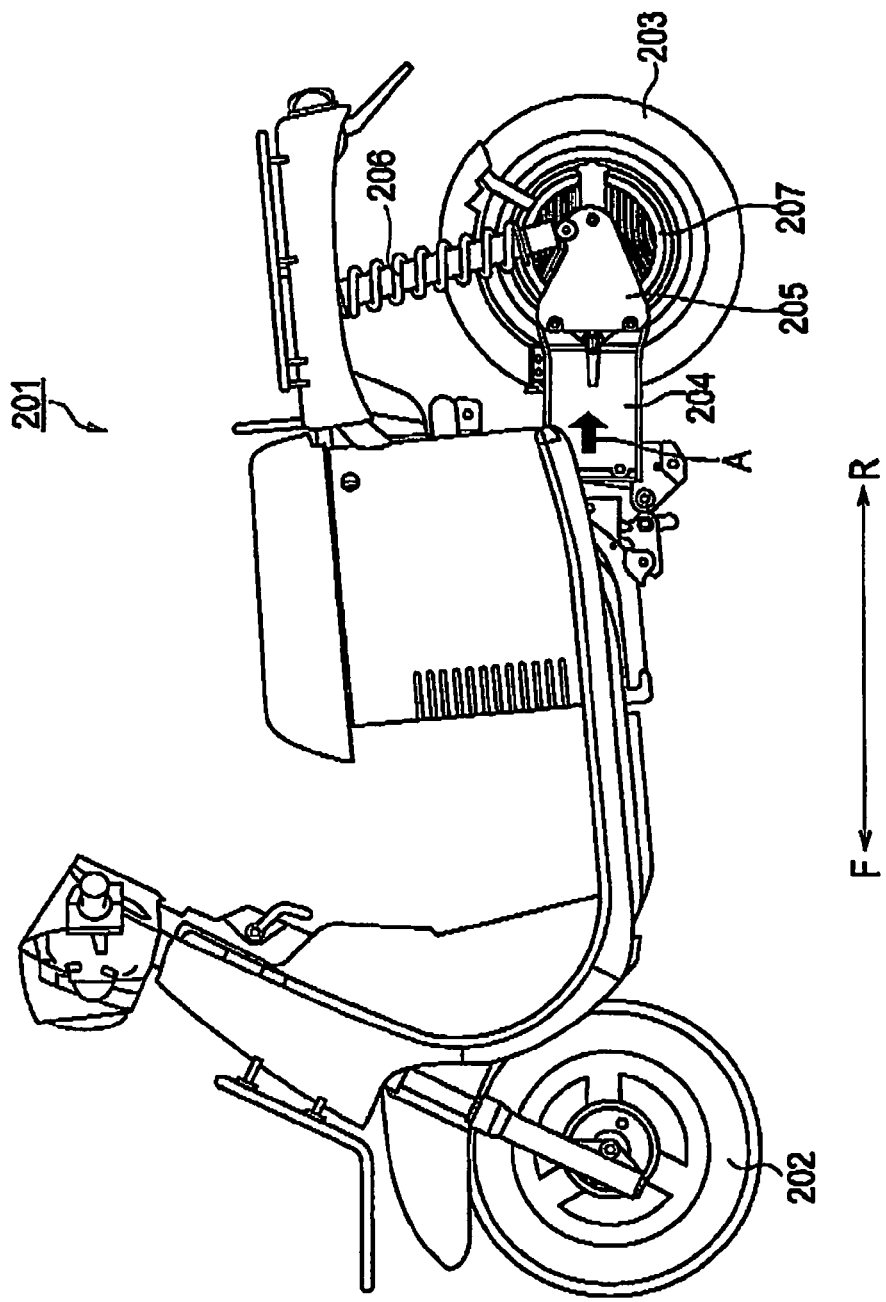
FIG. 13 is a right side view of an electric motorcycle 201 according to a third embodiment of the present invention.

With reference to the drawings, description will be given below of an electric motorcycle 201 that is an electric vehicle to which a molded motor according to a third embodiment of the present invention is applied. FIG. 13 is a right side view of the electric motorcycle 201.

As shown in FIG. 13, the electric motorcycle 201 is a so-called under-bone type electric motorcycle having a vehicle body frame provided on the lower side. The electric motorcycle 201 includes a front wheel 202, a rear wheel 203, a swing arm 204, a suspension case 205, a rear suspension 206 and a molded motor 207.

The front wheel 202 is rotatably supported by a front fork. The rear wheel 203 is rotatably supported by a motor shaft 250 (see FIG. 15) provided approximately in the center of the molded motor 207. The swing arm 204 is swingably attached to the vehicle body frame. The suspension case 205 is attached to a rear end of the swing arm 204 and the molded motor 207. The rear suspension 206 is supported by the suspension case 205 and the vehicle body frame (not shown), and absorbs impact applied to the rear wheel 203 from a road surface as well as allows the rear wheel 203 to follow the changing road surface.

The molded motor 207 is fixed to the swing arm 204. A driving force generated by the molded motor 207 is transmitted to the rear wheel 203 through the motor shaft 250 (see FIG. 15) provided approximately in the center of the molded motor 207. A configuration of the molded motor 207 will be described later.

Figure 14:
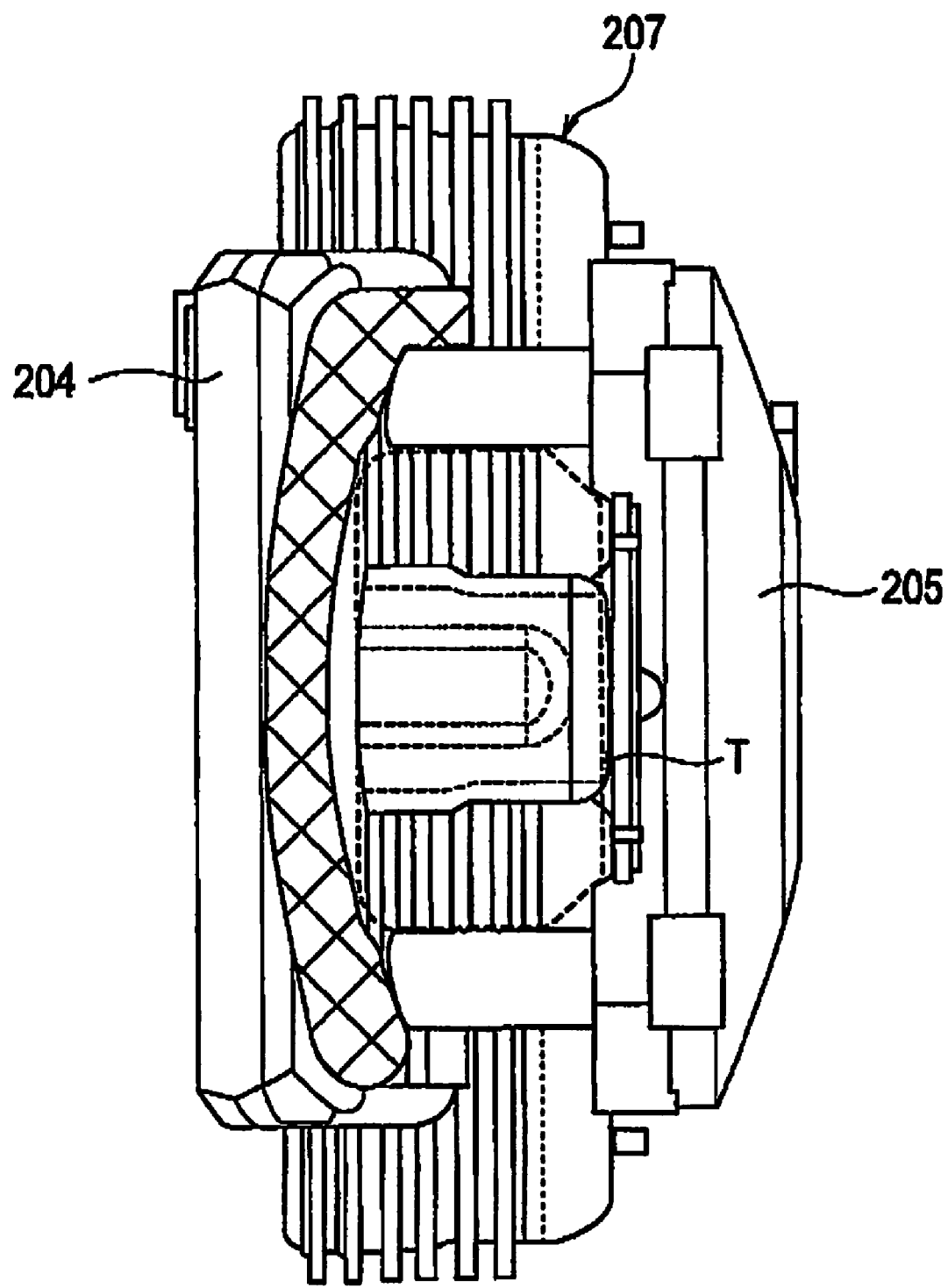
FIG. 14 is a view seen from an arrow A shown in FIG. 13.

Here, FIG. 14 is a view seen from an arrow A shown in FIG. 13. Note that an opening T is provided between the swing arm 204 and the suspension case 205 as shown in FIG. 14. The opening T is positioned in the front F of the molded motor 207. Therefore, while the electric motorcycle 201 is moving, a travelling wind flowing in from the opening T between the swing arm 204 and the suspension case 205 hits against the molded motor 207.

(Configuration of Molded Motor)

With reference to the drawings, description will be given below of the configuration of the molded motor according to the third embodiment. Note that, in the following description, an "output side" is a side of the molded motor 207 where the motor shaft 250 is connected to the rear wheel 203 and an "opposite output side" is a side opposite to the output side of the molded motor 207.

Figure 15:
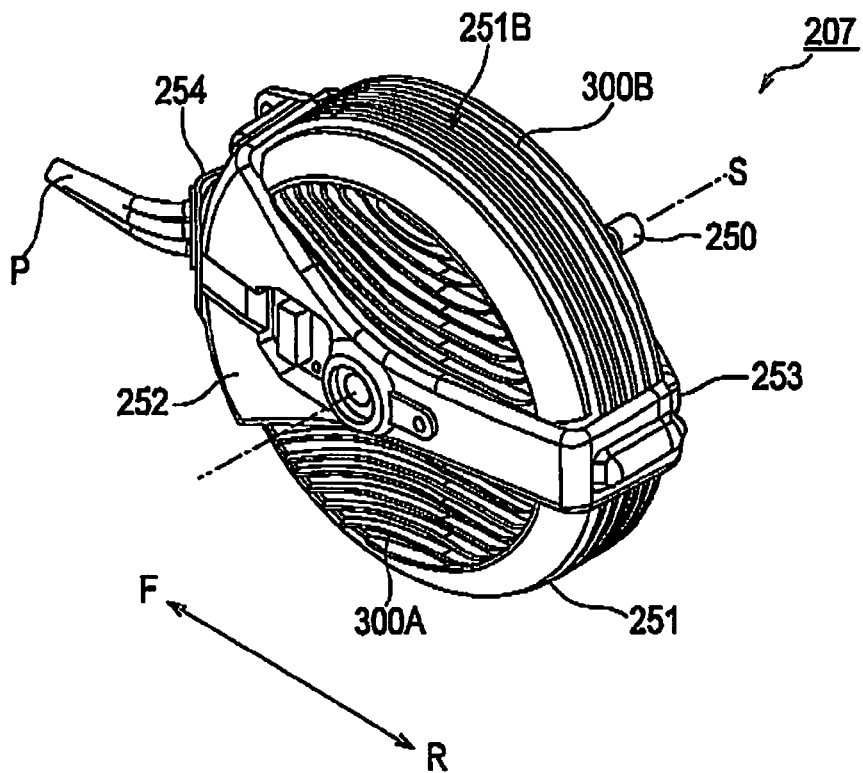
FIG. 15 is a perspective view of a molded motor 207, seen from obliquely above, according to the third embodiment of the present invention.
Figure 16:
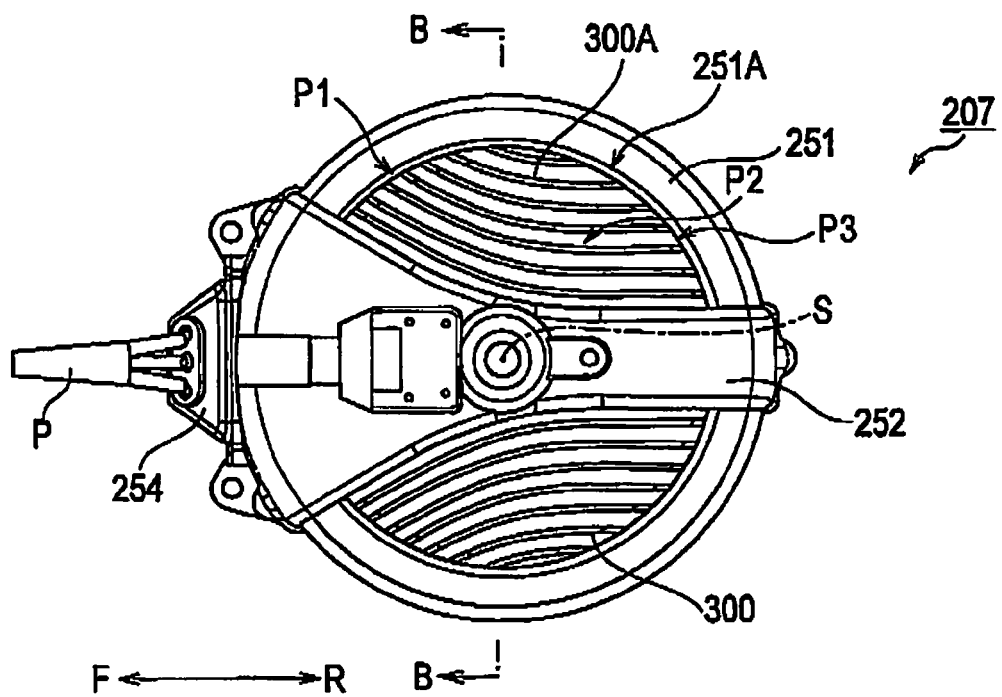
FIG. 16 is a plan view of the molded motor 207, seen from an opposite output side, according to the third embodiment of the present invention.
Figure 17:
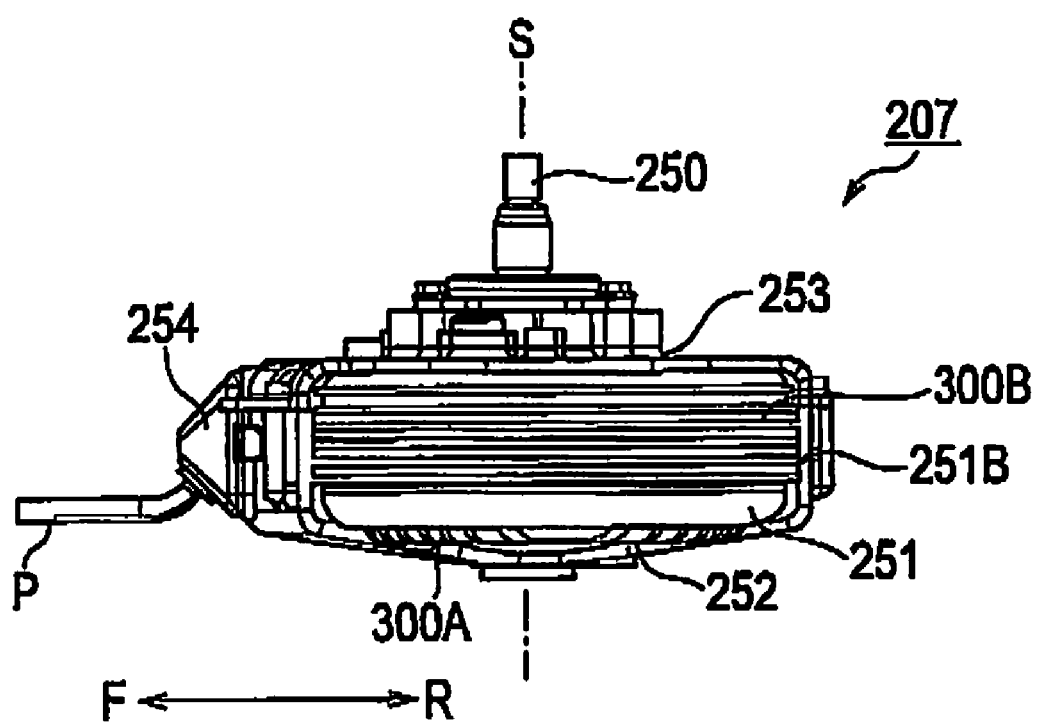
FIG. 17 is a top view of the molded motor 207, seen from above, according to the third embodiment of the present invention.

FIG. 15 is a perspective view of the molded motor 207 seen from obliquely above. FIG. 16 is a plan view of the molded motor 207 seen from the opposite output side. FIG. 17 is a top view of the molded motor 207 seen from above.

As shown in FIGS. 15 to 17, the molded motor 207 includes the motor shaft 250, a stator 251, a first motor case 252, a second motor case 253 and a terminal box 254.

The motor shaft 250 is provided approximately in the center of the molded motor 207 in a planar view. The motor shaft 250 is inserted into the second motor case 253 and protrudes from the stator 251. The motor shaft 250 is rotated with a rotor (see FIG. 18) provided inside the stator 251. The rear wheel 203 is driven by rotation of the motor shaft 250 around a shaft center S.

The stator 251 is formed into a cylindrical shape with the motor shaft 250 as its center. The stator 251 has a pair of cylindrical end faces provided perpendicular to the shaft center S. Note, however, that FIG. 16 shows only the opposite output side of the stator 251, that is, cylindrical end face 251A provided on the side opposite to the motor shaft 250. The pair of cylindrical end faces is provided on both ends of a peripheral surface 251B. The cylindrical end face 251A and the peripheral surface 251B are formed by a resin molded part 251d (see FIG. 18) to be described later. An internal structure of the stator 251 will be described later.

The first motor case 252 is provided on the cylindrical end face 251A of the stator 251. The first motor case 252 supports one end of a gear shaft 256 to be described later, and is screwed to the second motor case 253. In this embodiment, the first motor case 252 is formed in a fan shape gradually becoming wider toward the front F of the electric motorcycle 201 in a planar view of the cylindrical end face 251A as shown in FIG. 16.

The second motor case 253 is provided on the output side of the stator 251. The motor shaft 250 is inserted into the second motor case 253. Since the second motor case 253 is attached to the swing arm 204, the second motor case 253 preferably has more strength than the first motor case 252.

The terminal box 254 stores a cable P end to be connected to a battery. The battery is normally disposed below a seat. In this embodiment, the terminal box 254 is provided in front F of the first and second motor cases 252 and 253.

Here, as shown in FIGS. 15 to 17, the stator 251 has multiple first fins 300A and multiple second fins 300B.

The multiple first fins 300A are formed in a region of the cylindrical end face 251A, which is exposed from the first motor case 252. The multiple first fins 300A are formed to protrude from the cylindrical end face 251A and extended in the front and rear direction FR of the electric motorcycle 201. Therefore, an air inlet P1 through which the air flows in, an air passage P2 through which the air flows, and an air outlet P3 through which the air flows out are formed between two of the first fins 300A. The air inlet P1 is provided in front F of the shaft center S, and the air outlet P3 is provided in the rear R of the shaft center S. Moreover, as shown in FIG. 16, each of the multiple first fins 300A is formed to follow the outer shape of the first motor case 252 in the planar view of the cylindrical end face 251A.

The multiple second fins 300B are formed to protrude from the peripheral surface 251B of the stator 251. The multiple second fins 300B are formed along the circumference with the shaft center S as its center. Therefore, as shown in FIG. 17, the multiple second fins 300B are extended in the front and rear direction FR of the electric motorcycle 201 in a planar view of the peripheral surface 251B. Thus, although not shown, an air inlet through which the air flows in, an air passage through which the air flows, and an air outlet through which the air flows out are formed between two of the second fins 300B. The air inlet is provided in front F of the shaft center S, and the air outlet is provided in the rear R of the shaft center S.

(Internal Structure of Molded Motor)

Figure 18:
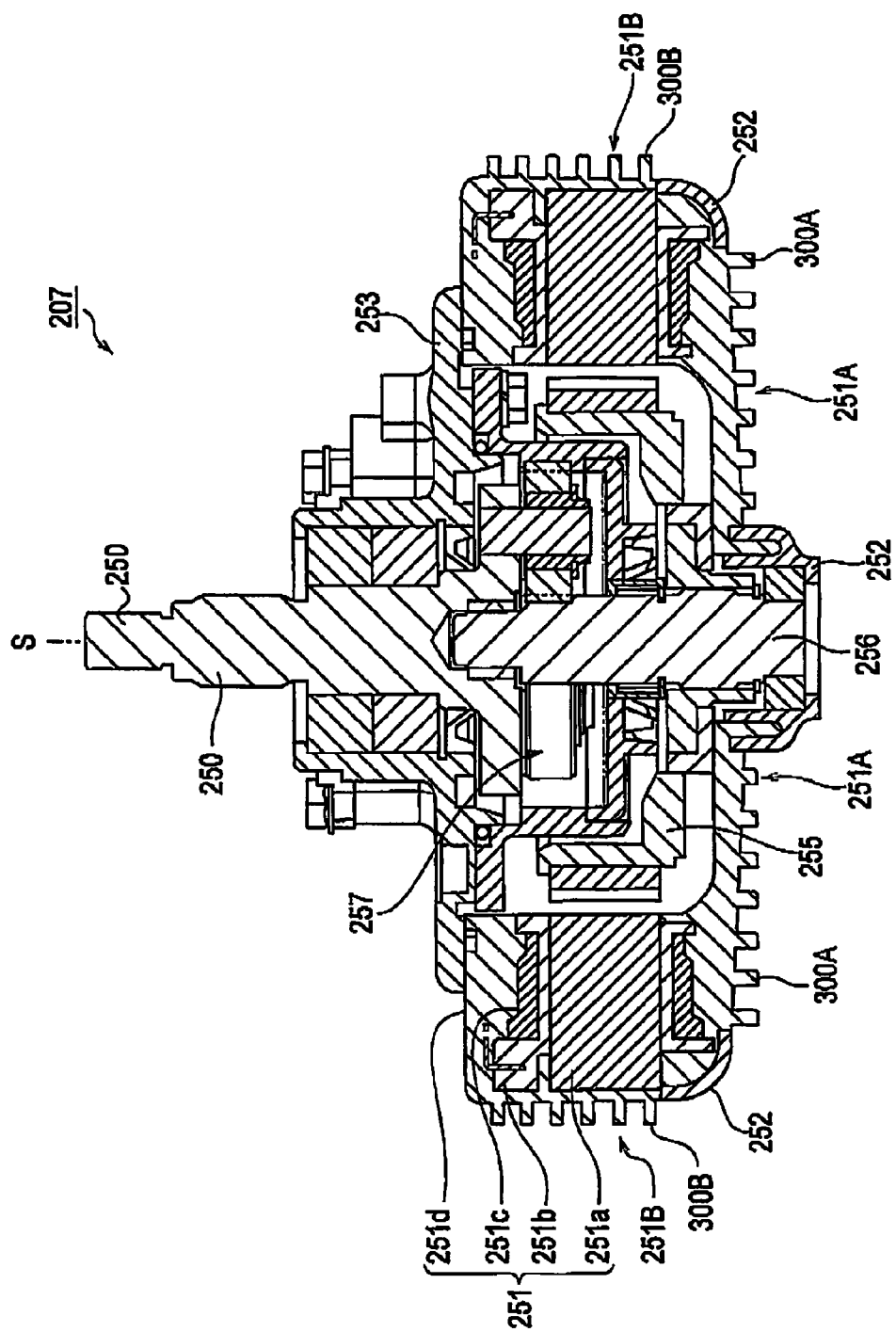
FIG. 18 is a cross-sectional view taken along the line B-B in FIG. 16.

With reference to the drawings, an internal structure of the molded motor 207 will be described below. FIG. 18 is a cross-sectional view taken along the line B-B in FIG. 16.

As shown in FIG. 18, the stator 251 has multiple teeth 251a, insulating members 251b, coils 251c and the resin molded part 251d. The multiple teeth 251a are arranged on a circle with the shaft center S as its center. The insulating members 251b cover peripheries of the teeth 251a, respectively. The coils 251c are wound around the insulating members 251b more than once. The resin molded part 251d integrally molds the multiple teeth 251a, the insulating members 251b and the coils 251c, and forms the cylindrical end face 251A and the peripheral surface 251B of the stator 251.

The molded motor 207 includes a rotor 255, the gear shaft 256 and a gear 257 in a space formed inside the stator 251.

The rotor 255 is rotated around the shaft center S on the inside of the multiple teeth 251a. The rotation of the rotor 255 is transmitted to the gear shaft 256 to be inserted into the center of the rotor 255.

The gear 257 transmits the rotation of the rotor 255, which is transmitted through the gear shaft 256, to the motor shaft 250 after decelerating the rotation at a predetermined reduction ratio.

Here, as shown in FIG. 18, the multiple first fins 300A are formed to protrude on the cylindrical end face 251A of the stator 251. Moreover, the multiple second fins 300B are formed to protrude on the peripheral surface 251B of the stator 251. The multiple first and second fins 300A and 300B are formed in the resin molded part 251d.

(Advantages and Effects)

In the molded motor 207 according to the third embodiment, the stator 251 has the multiple first fins 300A formed in the region of the cylindrical end face 251A, which is exposed from the first motor case 252. The first fins 300A are extended in the front and rear direction FR of the electric motorcycle 201 in the planar view of the cylindrical end face 251A.

Figure 19:
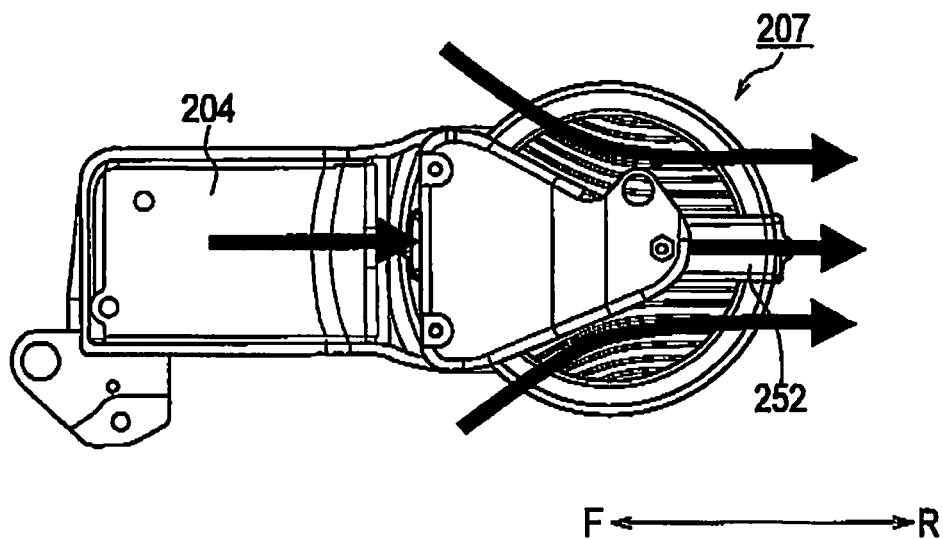
FIG. 19 is a schematic view showing a flow of a travelling wind on a surface of the molded motor 207 according to the third embodiment of the present invention.

As described above, the first fins 300A are formed in a direction in which the travelling wind flows while the electric motorcycle 201 is moving. Thus, as shown in FIG. 16, the air inlet P1 through which the air flows in, the air passage P2 through which the air flows, and the air outlet P3 through which the air flows out are formed between two of the first fins 300A. Therefore, as shown in FIG. 19, the travelling wind is allowed to flow along the first fins 300A on the cylindrical end face 251A. Thus, efficient cooling by the first fins 300A can be achieved. As a result, heat generated inside the stator 251 can be efficiently released to the outside of the stator 251.

Moreover, the cylindrical end face 251A is a face provided on the opposite output side of the stator 251, that is, on the side opposite to the motor shaft 250. Here, the strength of the first motor case 252 may be smaller than that of the second motor case 253 attached to the swing arm 204. Thus, the first motor case 252 can be made smaller than the second motor case 253. Therefore, an area of the first motor case 252 covering the cylindrical end face on the opposite output side of the motor shaft 250 of the stator 251 is reduced to be smaller than that of the second motor case 253 covering the cylindrical end face on the motor shaft 250 side of the stator 251. Moreover, an exposed area of the cylindrical end face 251A is set larger than that of the cylindrical end face on the motor shaft 250 side. Therefore, since the first fins 300A can be formed in a wider region, cooling can be performed more efficiently than the case where the first fins are formed on the cylindrical end face on the motor shaft 250 side.

Moreover, the first fins 300A are formed on the cylindrical end face 251A on the opposite output side of the stator 251. Thus, compared with the case where the first fins are formed on the cylindrical end face on the output side (the motor shaft 250 side) of the stator 251, to which the rear wheel 203, the swing arm 204 and the like are attached, the air flow for releasing the heat generated inside the stator to the outside of the stator is allowed to flow without being disturbed by the rear wheel 203, the swing arm 204 and the like. Therefore, cooling can be performed more efficiently than the case where the first fins 300A are formed on the cylindrical end face on the motor shaft 250 side.

Furthermore, the first fins 300A according to the third embodiment are formed to follow the outer shape of the first motor case 252 in the planar view of the cylindrical end face 251A. Therefore, the travelling wind is allowed to smoothly flow along the outer shape of the first motor case 252. Thus, the heat release properties of the molded motor 207 can be further improved.

Moreover, in the molded motor 207 according to the third embodiment, the stator 251 has the multiple second fins 300B formed on the peripheral surface 251B. The multiple second fins 300B are extended in the front and rear direction FR of the electric motorcycle 201 in the planar view of the peripheral surface 251B.

As described above, the second fins 300B are formed in the direction in which the travelling wind flows while the electric motorcycle 201 is moving. Thus, the heat release properties of the molded motor 207 can be further improved.

Furthermore, in the electric motorcycle 201 according to the third embodiment, the opening is provided between the swing arm 204 and the suspension case 205. The opening is positioned in front F of the molded motor 207. Therefore, while the electric motorcycle 201 is moving, a travelling wind flowing through the opening between the swing arm 204 and the suspension case 205 hits against the molded motor 207. As a result, deterioration in heat release properties of the molded motor 207 can be suppressed.

[Fourth Embodiment]

Next, with reference to the drawings, description will be given of a molded motor 207 according to a fourth embodiment of the present invention.

In the following description, differences from the third embodiment will be mainly described.

Figure 20:
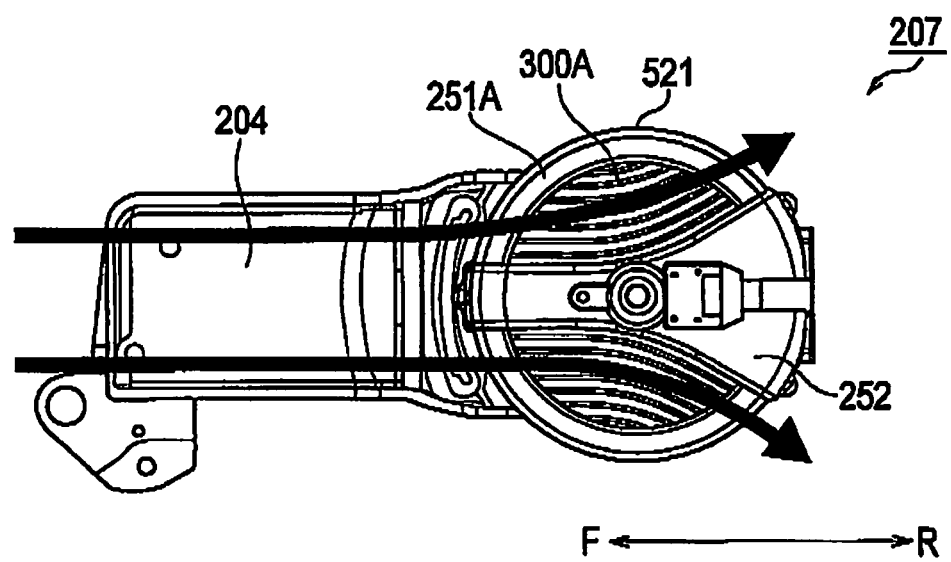
FIG. 20 is a right side view of an electric motorcycle 201, showing a configuration of a molded motor 207 according to a fourth embodiment of the present invention.

FIG. 20 is a right side view of an electric motorcycle 201, showing a configuration of the molded motor 207 according to the fourth embodiment.

As shown in FIG. 20, a first motor case 252 is formed in a fan shape gradually becoming wider toward the rear R of the electric motorcycle 201 in a planar view of a cylindrical end face 251A.

As shown in FIG. 20, each of multiple first fins 300A is formed to follow the outer shape of the first motor case 252 in the planar view of the cylindrical end face 251A. Specifically, the first fins 300A provided above the first motor case 252 are bent gradually upward toward the rear R, and the first fins 300A provided below the first motor case 252 are bent gradually downward toward the rear R.

(Advantages and Effects)

In the molded motor 207 according to the fourth embodiment, the outer shape of the first motor case 252 becomes wider in a vertical direction toward the rear R of the electric motorcycle 201 in the planar view of the cylindrical end face 251A. The first fins 300A are formed to follow the outer shape of the first motor case 252 in the planar view of the cylindrical end face 251A.

Therefore, as shown in FIG. 20, a travelling wind is allowed to smoothly flow along the outer shape of the first motor case 252. Thus, the heat release properties of the molded motor 207 can be further improved. Moreover, since the first motor case 252 is formed to become wider toward the rear R, the travelling wind is allowed to flow more smoothly than the case where the first motor case 252 is formed to become wider toward the front F.

[Other Embodiments]

Although the present invention has been described with reference to the above embodiments, it should be understood that the present invention is not limited to the description and drawings which constitute a part of this disclosure. From this disclosure, various alternative embodiments, examples and operational technologies will become apparent to those skilled in the art.

Figure 21:
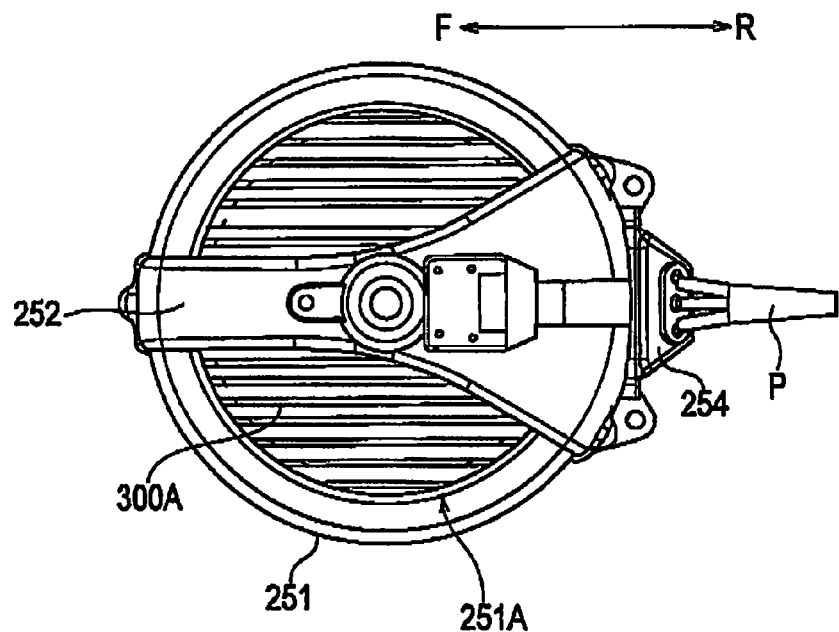
FIG. 21 is a right side view of an electric motorcycle 201, showing a configuration of a molded motor 207 according to an embodiment of the present invention.
Figure 22:
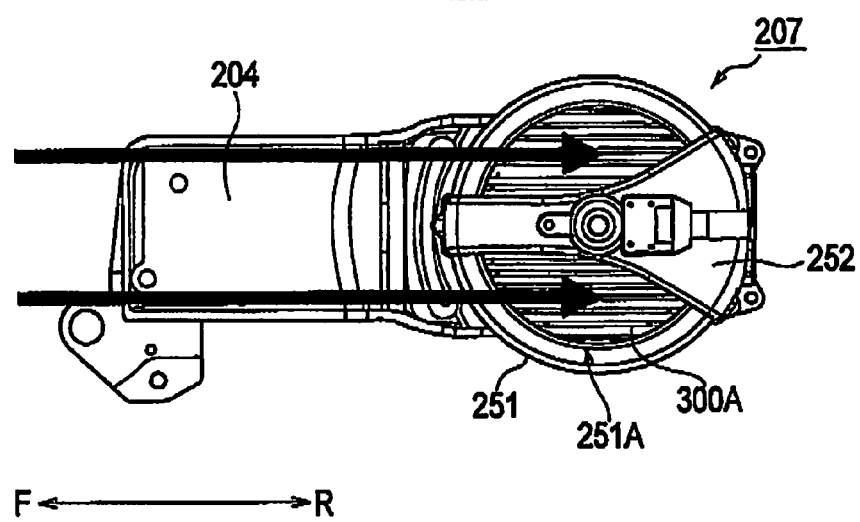
FIG. 22 is a schematic view showing a flow of a travelling wind on a surface of the molded motor 207 according to the embodiment of the present invention.

For example, although the first fins 300A are configured to follow the outer shape of the first motor case 252 in the planar view of the cylindrical end face 251A in the above embodiment, the first fins 300A may be configured not to follow the outer shape of the first motor case 252. To be more specific, as shown in FIG. 21, the first fins 300A may be formed in the front and rear direction FR of the vehicle. Also in this case, as shown in FIG. 22, the travelling wind is allowed to linearly flow between the first fins 300A.

Moreover, although the first fins 300A are formed on the cylindrical end face 251A of the stator 251 on the side opposite to the motor shaft 250, the first fins may be formed on the cylindrical end face on the motor shaft 250 side.

[Fifth Embodiment]

(Schematic Configuration of Electric Vehicle)

Figure 23:
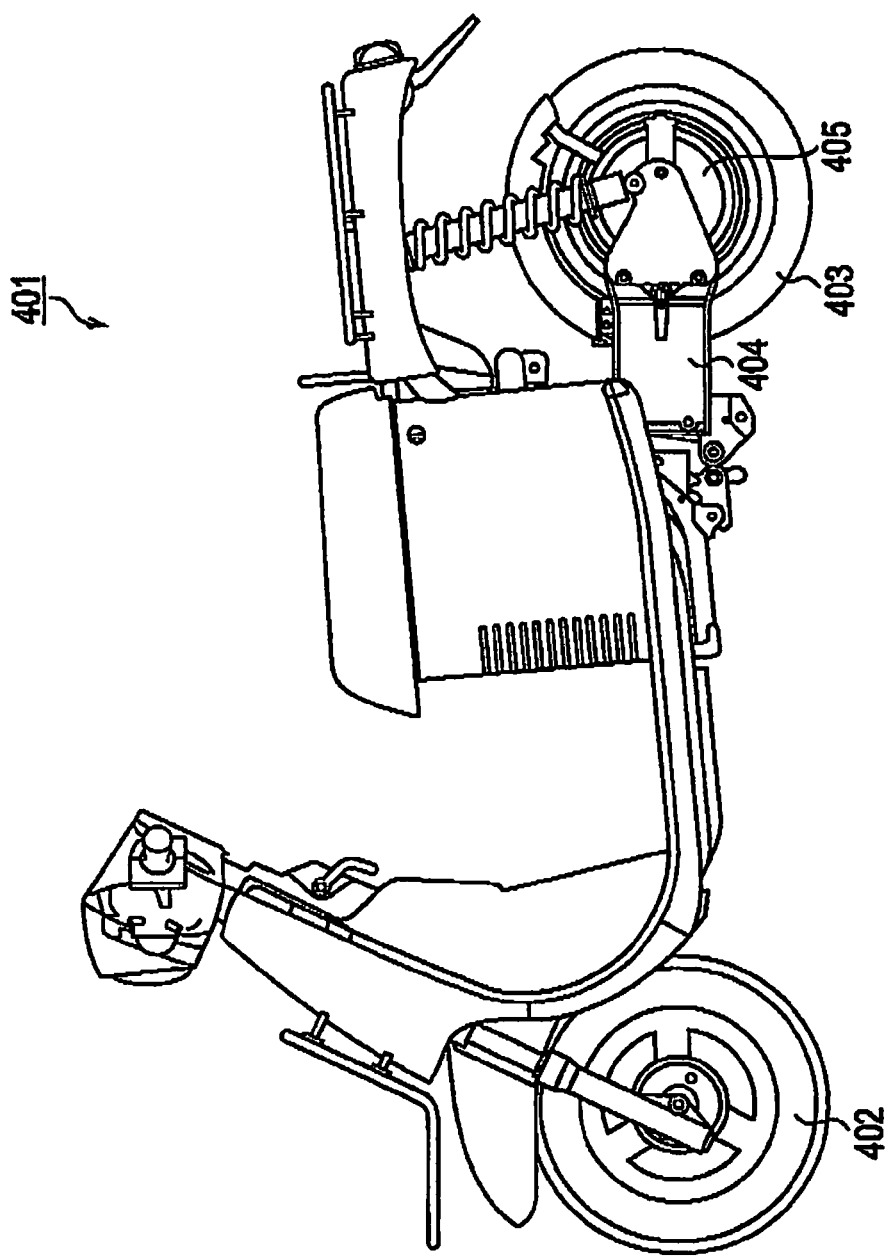
FIG. 23 is a right side view of an electric motorcycle 401 according to a fifth embodiment of the present invention.

With reference to the drawings, description will be given below of an electric motorcycle 401 that is an electric vehicle to which a molded motor according to a fifth embodiment of the present invention is applied. FIG. 23 is a right side view of the electric motorcycle 401.

As shown in FIG. 23, the electric motorcycle 401 is a so-called under-bone type electric motorcycle having a vehicle body frame provided on the lower side. The electric motorcycle 401 includes a front wheel 402, a rear wheel 403, a swing arm 404 and a molded motor 405.

The front wheel 402 is rotatably supported by a front fork. The rear wheel 403 is rotatably supported by the swing arm 404. The swing arm 404 is swingably attached to the vehicle body frame.

The molded motor 405 is fixed to the swing arm 404. A driving force generated by the molded motor 405 is transmitted to the rear wheel 403 through a motor shaft 450 (see FIG. 24) provided approximately in the center of the molded motor 405. The molded motor 405 may be a geared motor with a built-in reducer. A configuration of the molded motor 405 will be described later.

(Configuration of Molded Motor)

With reference to the drawings, description will be given below of the configuration of the molded motor according to the fifth embodiment. Note that, in the following description, an "output side" is a side of the molded motor 405 where the motor shaft 450 is connected to the rear wheel 403 and an "opposite output side" is a side opposite to the output side of the molded motor 405.

Figure 24:
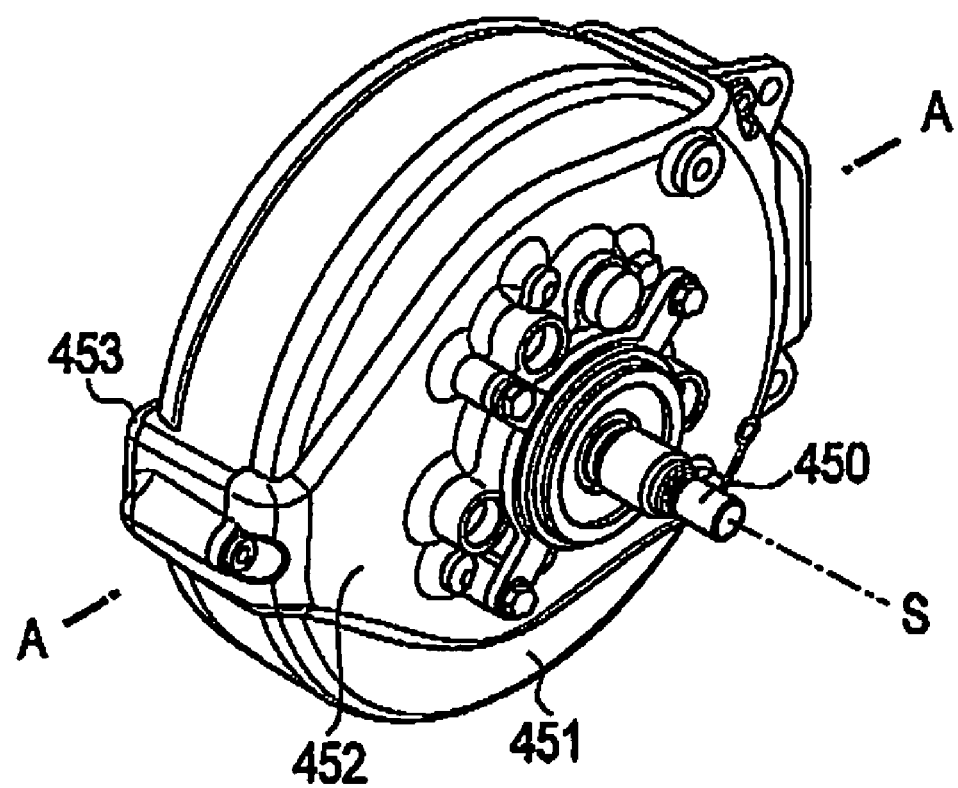
FIG. 24 is a perspective view of a molded motor 405 according to the fifth embodiment of the present invention.

FIG. 24 is a perspective view of the molded motor 405. As shown in FIG. 24, the molded motor 405 includes the motor shaft 450, a stator 451, a first motor case 452 and a second motor case 453.

The motor shaft 450 is provided approximately in the center of the molded motor 405. The motor shaft 450 is inserted into the first motor case 452. The rear wheel 403 is driven by rotation of the motor shaft 450 around a shaft center S.

The stator 451 is formed into a ring shape with the shaft center S as its center. The stator 451 is formed by molding, with a resin-molded part, multiple teeth arranged on a circle with the shaft center S as its center and coils wound around the multiple teeth, respectively (not shown). Inside the annular stator 451, a cylindrical internal space P is formed. An internal structure of the molded motor 405 will be described later.

The first motor case 452 covers the output side of the stator 451 (the internal space P). The motor shaft 450 is inserted into the first motor case 452. The first motor case 452 is screwed to the swing arm 404.

The second motor case 453 covers the opposite output side of the stator 451 (the internal space P). The internal space P is sealed by screwing the first and second motor cases 452 and 453 to each other.

(Internal Structure of Molded Motor)

Figure 25:
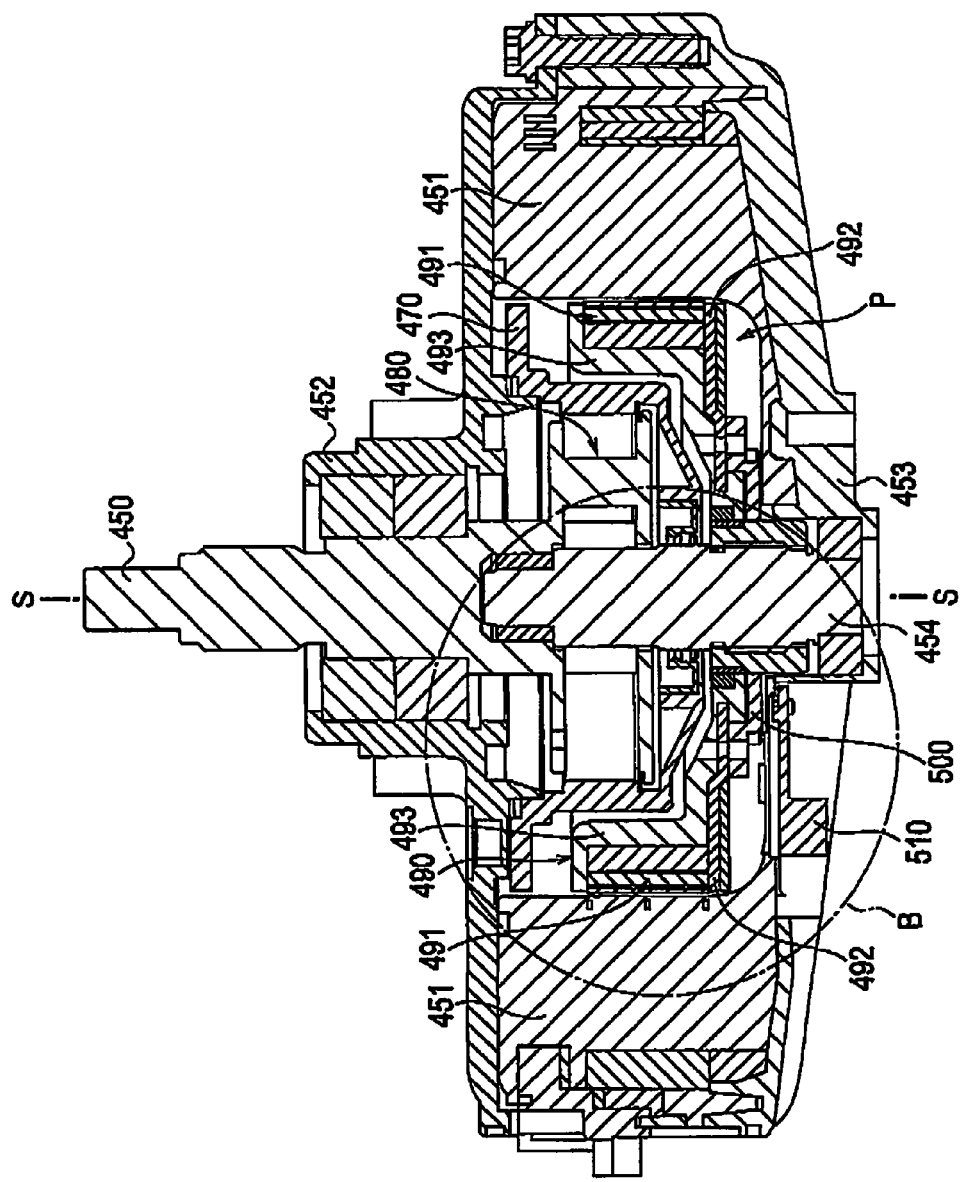
FIG. 25 is a cross-sectional view taken along the line A-A in FIG. 24.

With reference to the drawings, the internal structure of the molded motor 405 will be described below. FIG. 25 is a cross-sectional view taken along the line A-A in FIG. 24.

As shown in FIG. 25, the molded motor 405 includes a gear case 470, a reducer 480, a rotor 490, a position detecting magnet 500 and a position detecting element mounting PCB 510 (Printed Circuit Board), in the internal space P.

The gear case 470 is formed in a dome shape and connected to the first motor case 452. The reducer 480 is stored between the gear case 470 and the first motor case 452.

The reducer 480 transmits the rotation of the rotor 490, which is transmitted through a gear shaft 454, to the motor shaft 450 after decelerating the rotation at a predetermined reduction ratio.

The rotor 490 is disposed between the gear case 470 and the second motor case 453. The rotor 490 is formed in a ring shape and rotated around the shaft center S. The rotation of the rotor 490 is transmitted to the reducer 480 through the gear shaft 454 inserted into the center of the rotor 490.

Here, the rotor 490 includes multiple rotor magnets 491, a rotor plate 492, a molded part 493 and a rotor core 494 having the multiple rotor magnets 491. Each of the multiple rotor magnets 491 is inserted into the rotor core 494. The multiple rotor magnets 491 are arranged along the circumference with the shaft center S as its center and disposed so as to face the stator 451. The rotor core 494 is disposed on a side surface (a first main surface 492A to be described later) of the rotor plate 492. Similarly, the multiple rotor magnets 491 are also disposed on the side surface of the rotor plate 492. The molded part 493 molds the multiple rotor magnets 491, the rotor plate 492 and the rotor core 494.

The stator 451 is formed by molding, with a resin material, multiple teeth arranged on a circle with the shaft center S as its center and coils wound around the teeth with insulating members interposed therebetween.

The position detecting magnet 500 is a magnetic member used for detecting positions of the multiple rotor magnets 491. The position detecting magnet 500 is mounted on the opposite output side of the rotor 490. A mounted state of the position detecting magnet 500 will be described later. Note that, when a plastic magnet is used as the position detecting magnet 500, dimensional accuracy can be improved compared with the case of using a sintered magnet.

The position detecting element mounting PCB 510 has a function to detect a position of the position detecting magnet 500. The position detecting element mounting PCB 510 is mounted on the opposite output side of the stator 451.

(Mounted State of Position Detecting Magnet)

Figure 26:
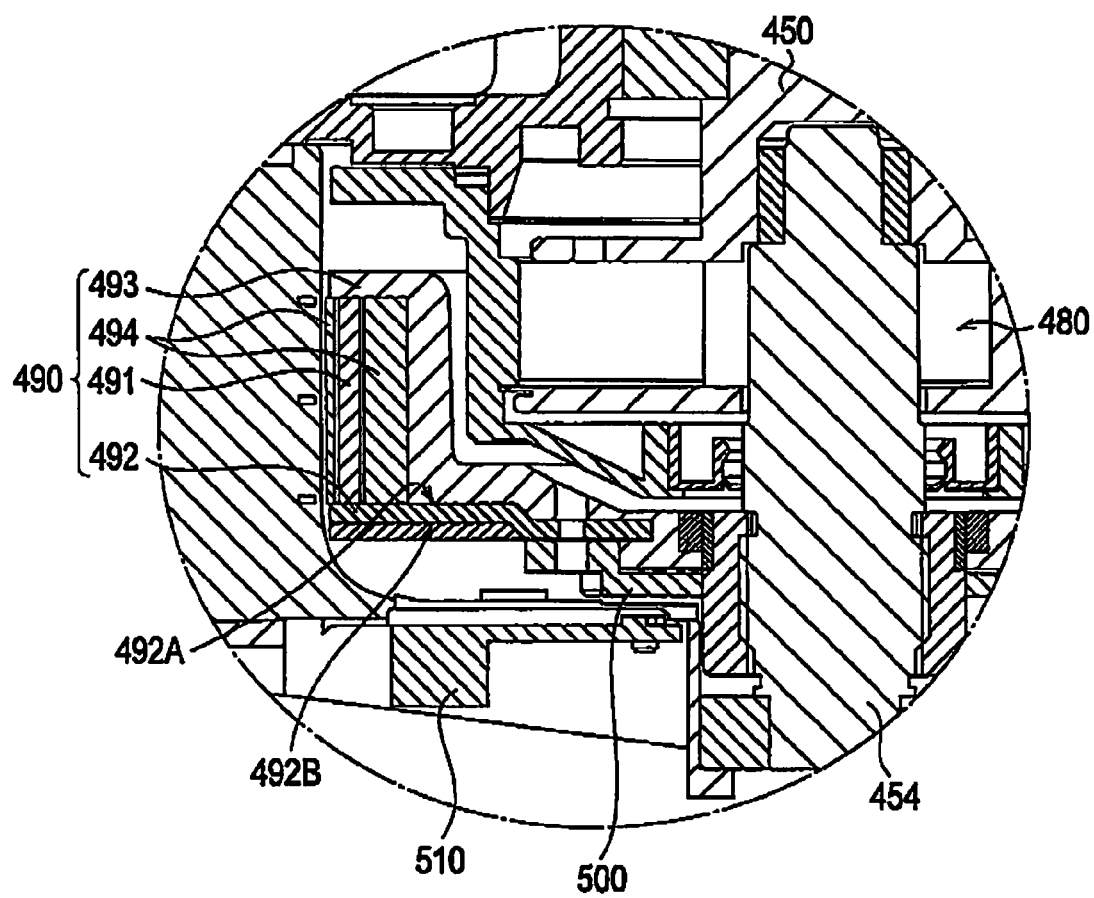
FIG. 26 is an enlarged view of a section B in FIG. 25.
Figure 27:
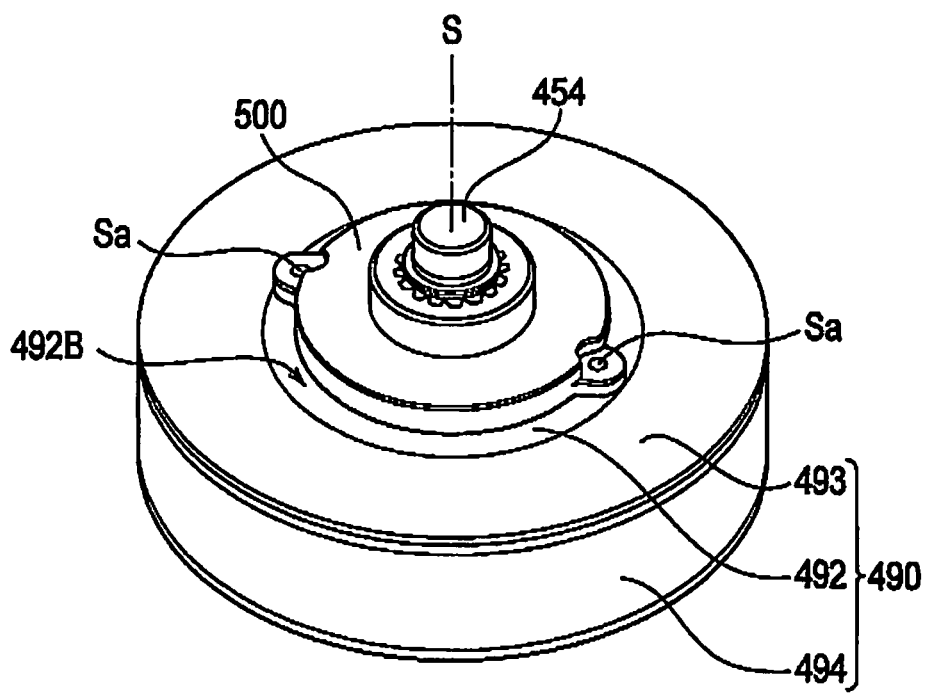
FIG. 27 is a perspective view of a position detecting magnet 500, seen from an opposite output side, which is attached to a rotor 490 according to the fifth embodiment of the present invention.
Figure 28:
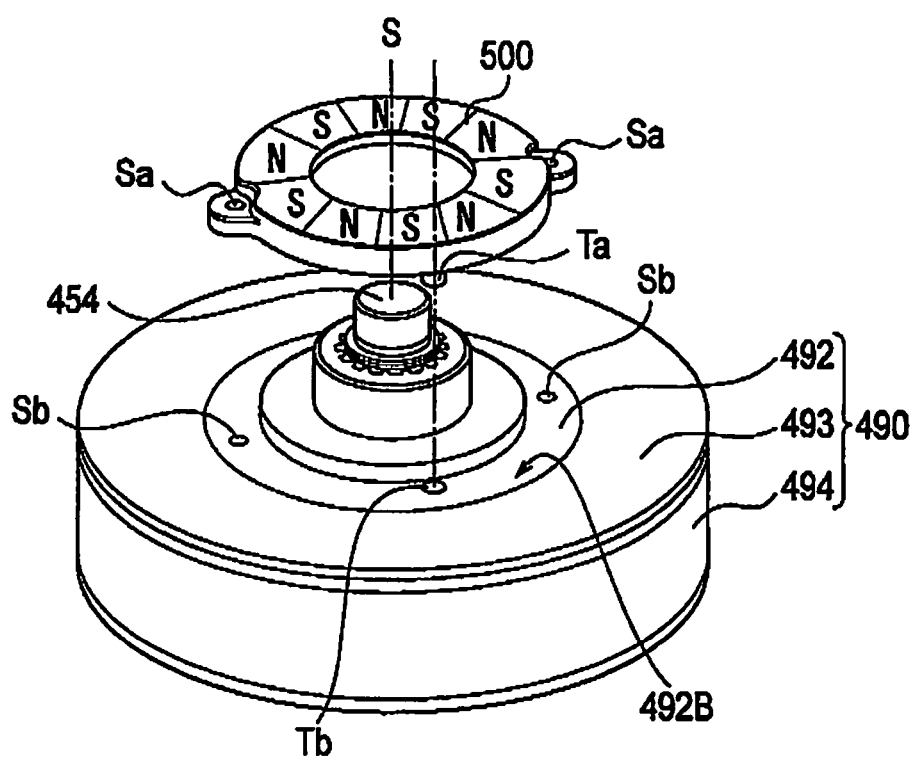
FIG. 28 is a view showing a state where the position detecting magnet 500 is detached from the rotor 490 according to the fifth embodiment of the present invention.

With reference to the drawings, the mounted state of the position detecting magnet 500 will be described below. FIG. 26 is an enlarged view of a section B in FIG. 25. FIG. 27 is a perspective view of the position detecting magnet 500, seen from the opposite output side, which is attached to the rotor 490. FIG. 28 is a view showing a state where the position detecting magnet 500 is detached from the rotor 490.

As shown in FIG. 26, the rotor plate 492 has the first main surface 492A provided on the output side and a second main surface 492B provided on the side opposite to the first main surface 492A. The first main surface 492A faces the reducer 480. On the first main surface 492A, the rotor core 494 and the multiple rotor magnets 491 are disposed.

As shown in FIGS. 27 and 28, the position detecting magnet 500 is attached to the second main surface 492B of the rotor plate 492. To be more specific, locking parts Ta formed on a surface of the position detecting magnet 500 facing the second main surface 492B are locked in locking holes Tb formed in the second main surface 492B of the rotor plate 492. Moreover, attachment holes Sa formed in the position detecting magnet 500 are screwed to attachment holes Sb formed in the second main surface 492B of the rotor plate 492.

Note that the position detecting magnet 500 is formed by molding a kneaded material of a magnetic material and resin with a die. Therefore, as shown in FIG. 28, magnetic poles (north pole and south pole) are directly magnetized on the surface of the position detecting magnet 500. The number of poles on the position detecting magnet 500 is equal to that on the multiple rotor magnets 491.

Figure 29:
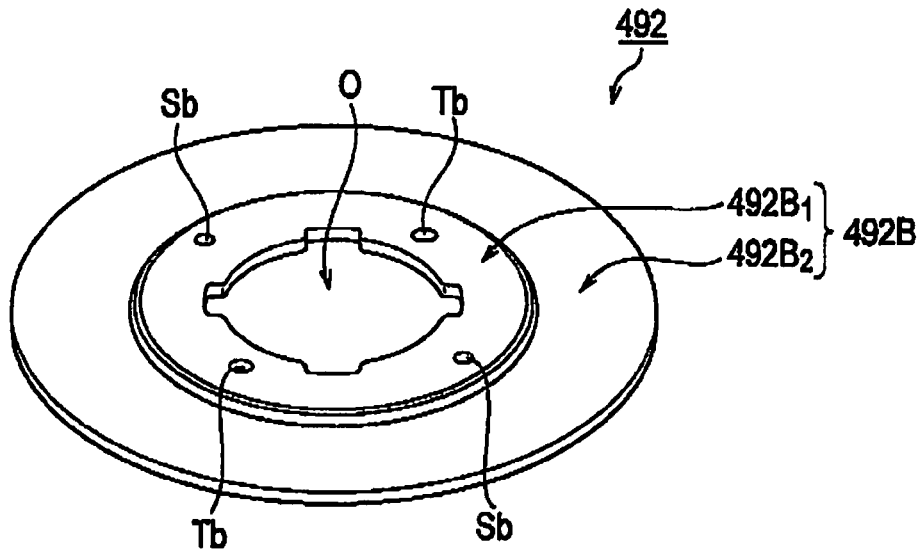
FIG. 29 is a perspective view of a rotor plate 492, seen from a second main surface 492B side, according to the fifth embodiment of the present invention.

FIG. 29 is a perspective view of the rotor plate 492 seen from the second main surface 492B side. As shown in FIG. 29, the second main surface 492B includes a first region 492B1 and a second region 492B2.

The first region 492B1 is a region of the second main surface 492B exposed from the molded part 493. The position detecting magnet 500 is attached to the first region 492B1. The second region 492B2 surrounds the first region 492B1. The second region 492B2 is a region of the second main surface 492B covered with the molded part 493. As shown in FIGS. 26 and 29, the first region 492B1 is formed to protrude from the second region 492B2 toward the side opposite to the first main surface 492A. In other words, the first region 492B1 is formed to protrude from the second region 492B2 toward the opposite output side.

Figure 30:
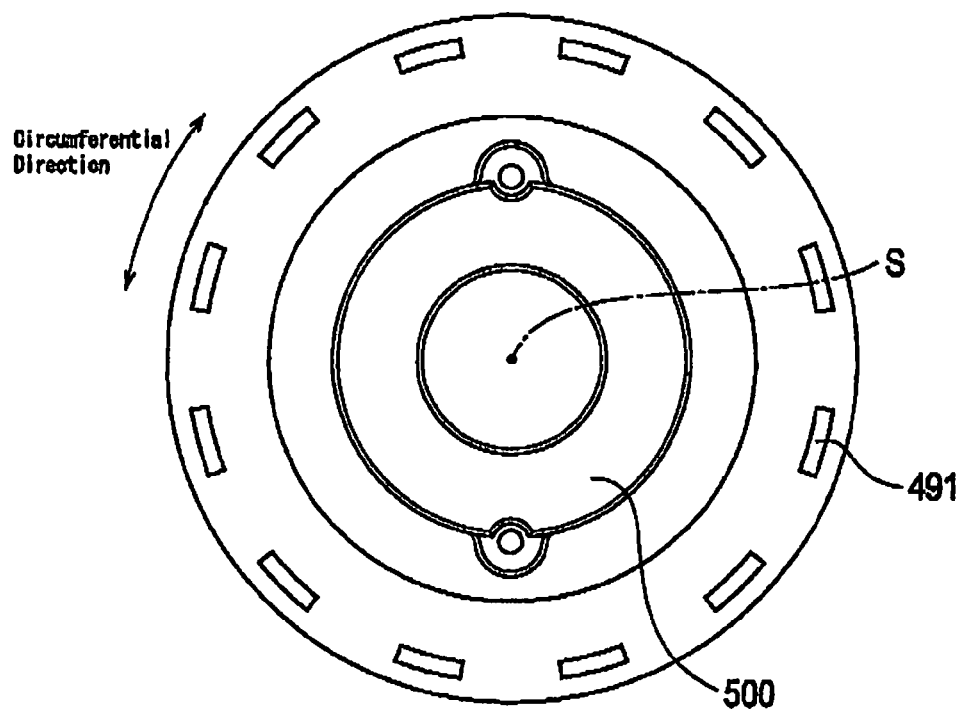
FIG. 30 is a view showing multiple rotor magnets 491 and the position detecting magnet 500 projected onto a projection plane approximately perpendicular to a shaft center S according to the fifth embodiment of the present invention.

FIG. 30 is a view showing the multiple rotor magnets 491 and the position detecting magnet 500 projected onto a projection plane approximately perpendicular to the shaft center S of the stator 451.

As shown in FIG. 30, the multiple rotor magnets 491 are arranged in a ring form in the circumferential direction with the shaft center S as its center. The position detecting magnet 500 is disposed at an inner side of the multiple rotor magnets 491.

(Advantages and Effects)

In the molded motor 405 according to the fifth embodiment of the present invention, the position detecting magnet 500 is attached to the first region 492B1 of the second main surface 492B of the rotor plate 492, the region being exposed from the molded part 493.

By exposing the first region 492B1 from the molded part 493 as described above, the position detecting magnet 500 can be easily attached to the rotor 490. Thus, since a supporting member or the like for attaching the position detecting magnet 500 to the rotor 490 is not required, the molded motor can be reduced in size and weight.

Moreover, the position detecting magnet 500 can be directly attached to the rotor plate 492. Thus, compared with the case where the position detecting magnet 500 is attached to the molded part 493, attachment strength of the position detecting magnet 500 can be improved. Therefore, a position detection error in a use environment of the molded motor 405 can be reduced.

Here, the inside of the multiple rotor magnets 491 is normally used as a space for disposing the reducer 480 and the like. Thus, it is difficult to dispose the position detecting element mounting PCB 510 on the first main surface 492A side of the rotor plate 492. On the other hand, when the position detecting element mounting PCB 510 is disposed on the second main surface 492B side of the rotor plate 492 and the position detecting magnet 500 is disposed on the first main surface 492A side, a magnetic circuit is formed between the position detecting magnet 500 and the gear case 470 made of iron or the like. For this reason, the position detection error may be increased. Therefore, in the fifth embodiment of the present invention, the position detecting magnet 500 is attached to the second main surface 492B of the rotor plate 492. Thus, the position detection error due to the position detecting element mounting PCB 510 can be reduced.

Figure 31:
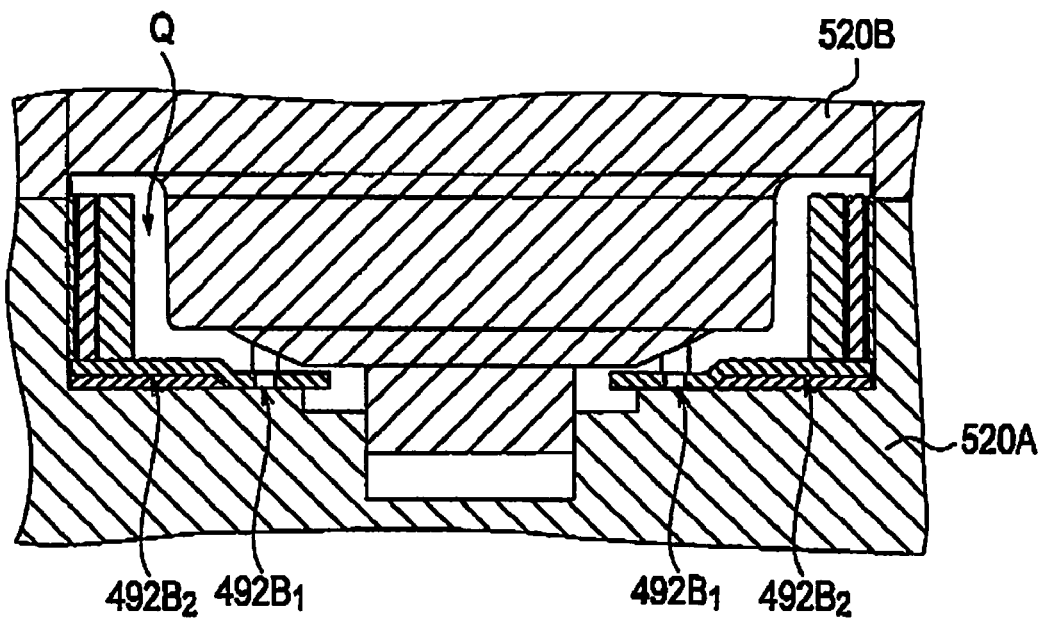
FIG. 31 is a view for explaining a method for manufacturing the rotor 490 according to the fifth embodiment of the present invention.

Moreover, the first region 492B1, to which the position detecting magnet 500 is attached, protrudes from the second region 492B2 covered with the molded part 493. Here, as shown in FIG. 31, the multiple rotor magnets 491 and the rotor plate 492 are molded by injecting a resin material between a lower die 520A and an upper die 520B after sequentially disposing the rotor plate 492 and the multiple rotor magnets 491 on the lower die 520A. Therefore, by allowing the first region 492B1 to protrude from the second region 492B2, the first region 492B1 that is not covered with the resin material in the molding process can be easily formed.

Moreover, on the projection plane approximately perpendicular to the shaft center S, the position detecting magnet 500 is disposed at an inner side of the multiple rotor magnets 491. Thus, since the position detecting magnet 500 is reduced in size, manufacturing cost of the molded motor 405 can be reduced.

Furthermore, the position detecting magnet 500 has the locking parts Ta protruding toward the rotor plate 492, and the rotor plate 492 has the locking holes Tb for locking the locking parts Ta. Therefore, positional accuracy in attachment of the position detecting magnet 500 can be improved, and a positional shift in a use environment of the position detecting magnet 500 can be suppressed.

[Other Embodiments]

Although the present invention has been described with reference to the above embodiments, it should be understood that the present invention is not limited to the description and drawings which constitute a part of this disclosure. From this disclosure, various alternative embodiments, examples and operational technologies will become apparent to those skilled in the art.

For example, although the description was given of the case where the molded motor 405 is applied to the electric motorcycle 401 in the above embodiment, the present invention is not limited thereto. For example, the molded motor 405 can be applied to a blower, a washing machine and the like.

Moreover, although the position detecting magnet 500 is screwed to the rotor plate 492 in the above embodiment, the present invention is not limited thereto. For example, the position detecting magnet 500, the rotor plate 492 and the multiple rotor magnets 491 may be integrally molded with a resin material.

As described above, it should be understood that the present invention includes various embodiments and the like which are not described herein. Therefore, the present invention is limited only by items specific to the invention according to claims pertinent based on the foregoing disclosure.

What is claimed is:

1. A molded motor used as a drive source for an electric vehicle, comprising:
   a cylindrical stator having a resin molded part molding multiple teeth;
   a rotor rotated inside the stator; and
   a motor case provided on a cylindrical end face of the cylindrical stator; wherein
   the resin molded part has multiple first fins formed in a region of the cylindrical end face, the region is exposed from the motor case, and
   each of the multiple first fins is extended in a front and rear direction of the electric vehicle, wherein
   the motor case is extended in the front and rear direction of the electric vehicle on the cylindrical end face, and
   each of the multiple first fins follows the outer shape of the motor case, in a planar view of the cylindrical end face.

2. The molded motor according to claim 1, wherein the outer shape of the motor case becomes wider in a vertical direction toward the rear of the electric vehicle, in the planar view of the cylindrical end face.

3. An electric vehicle comprising the molded motor according to claim 1, and a drive wheel.

\* \* \* \* \*